United States Patent
Toyotaka et al.

(10) Patent No.: US 9,851,776 B2
(45) Date of Patent: Dec. 26, 2017

(54) SEMICONDUCTOR DEVICE

(71) Applicant: Semiconductor Energy Laboratory Co., LTD., Atsugi-shi, Kanagawa-ken (JP)

(72) Inventors: Kouhei Toyotaka, Kanagawa (JP); Yuji Iwaki, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 58 days.

(21) Appl. No.: 14/695,797

(22) Filed: Apr. 24, 2015

(65) Prior Publication Data

US 2015/0316976 A1     Nov. 5, 2015

(30) Foreign Application Priority Data

May 2, 2014   (JP) ................................ 2014-095028

(51) Int. Cl.
   *G09G 3/30*   (2006.01)
   *G09G 3/32*   (2016.01)
   (Continued)

(52) U.S. Cl.
   CPC .......... *G06F 1/3265* (2013.01); *G06F 1/1641* (2013.01); *G06F 1/1643* (2013.01); (Continued)

(58) Field of Classification Search
   CPC .... G06F 1/1616; G06F 1/1677; G06F 1/1641; G06F 3/1423; G09G 3/3208; G09G 2300/0408; G09G 2310/0218
   See application file for complete search history.

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| | (Continued) | |

FOREIGN PATENT DOCUMENTS

| | | |
|---|---|---|
| EP | 1737044 A | 12/2006 |
| EP | 2226847 A | 9/2010 |
| | (Continued) | |

OTHER PUBLICATIONS

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

(Continued)

*Primary Examiner* — Michael J Eurice
(74) *Attorney, Agent, or Firm* — Nixon Peabody LLP; Jeffrey L. Costellia

(57) ABSTRACT

A low-power semiconductor device is provided. The semiconductor device includes a movable portion, a plurality of scan line driver circuits, and a control portion. The movable portion includes a plurality of regions driven by the plurality of scan line driver circuits. One of the scan line driver circuits is electrically connected to another one of the scan line driver circuits adjacent to the scan line driver circuit through a switch. The control portion has a function of supplying a start pulse to one scan line driver circuit selected from the plurality of scan line driver circuits. The movable portion can be folded between the plurality of regions.

14 Claims, 10 Drawing Sheets

(51) Int. Cl.
*G06F 1/32* (2006.01)
*G06F 1/16* (2006.01)
*G06F 3/14* (2006.01)
*G09G 3/3208* (2016.01)

(52) U.S. Cl.
CPC .......... *G06F 1/1652* (2013.01); *G06F 1/1677* (2013.01); *G06F 1/3287* (2013.01); *G06F 1/1616* (2013.01); *G06F 3/1423* (2013.01); *G09G 3/3208* (2013.01); *G09G 2300/0408* (2013.01); *G09G 2310/0218* (2013.01); *Y02B 60/1242* (2013.01)

(56) References Cited

U.S. PATENT DOCUMENTS

| | | |
|---|---|---|
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,538,753 B2 | 5/2009 | Tanada |
| 7,674,650 B2 | 3/2010 | Akimoto et al. |
| 7,732,819 B2 | 6/2010 | Akimoto et al. |
| 2001/0005454 A1* | 6/2001 | Nishino ............... H04M 1/0216 396/287 |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0002615 A1* | 1/2003 | Morosawa ............... G11C 8/04 377/64 |
| 2003/0090198 A1* | 5/2003 | Aston ................ G02F 1/13336 313/498 |
| 2003/0151562 A1* | 8/2003 | Kulas .................... G06F 3/1446 345/1.1 |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2004/0150581 A1* | 8/2004 | Westerinen ........... G06F 1/1601 345/1.3 |
| 2004/0263066 A1* | 12/2004 | Abe ....................... H01L 27/322 313/504 |
| 2004/0263741 A1* | 12/2004 | Koyama .............. G09G 3/3233 349/139 |
| 2005/0017302 A1 | 1/2005 | Hoffman |
| 2005/0057435 A1* | 3/2005 | Su ....................... G02F 1/13336 345/1.3 |
| 2005/0057580 A1* | 3/2005 | Yamano ............... G09G 3/3241 345/690 |
| 2005/0140648 A1* | 6/2005 | Siddeeq .................. G06F 1/163 345/156 |
| 2005/0168399 A1* | 8/2005 | Palmquist ............. G06F 1/1601 345/1.1 |
| 2005/0180083 A1* | 8/2005 | Takahara ............... G09G 3/006 361/152 |
| 2005/0199959 A1 | 9/2005 | Chiang et al. |
| 2006/0012951 A1* | 1/2006 | Kim ....................... G06F 1/1641 361/679.04 |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0164380 A1* | 7/2006 | Yang ..................... G09G 3/3677 345/103 |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0212271 A1* | 9/2008 | Misawa ............ G02F 1/133305 361/679.01 |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0015513 A1* | 1/2009 | Kim ....................... G06F 3/1446 345/1.3 |
| 2009/0021162 A1* | 1/2009 | Cope ........................ G09G 3/30 313/511 |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0001925 A1* | 1/2010 | Kim ....................... G06F 3/1446 345/1.3 |
| 2010/0060664 A1* | 3/2010 | Kilpatrick, II ........ G06F 1/1616 345/650 |
| 2010/0064244 A1* | 3/2010 | Kilpatrick, II ........ G06F 1/1616 715/773 |
| 2010/0065844 A1 | 3/2010 | Tokunaga |
| 2010/0066643 A1* | 3/2010 | King ..................... G06F 1/1616 345/1.3 |
| 2010/0092800 A1 | 4/2010 | Itagaki et al. |

(56) References Cited

U.S. PATENT DOCUMENTS

| | | | | |
|---|---|---|---|---|
| 2010/0097379 | A1* | 4/2010 | Choi | G09G 5/363 345/428 |
| 2010/0109002 | A1 | 5/2010 | Itagaki et al. | |
| 2010/0128019 | A1* | 5/2010 | Harada | G06F 3/147 345/212 |
| 2011/0109526 | A1* | 5/2011 | Bauza | G06F 3/1446 345/1.3 |
| 2011/0285647 | A1* | 11/2011 | Imamura | G06F 1/1616 345/173 |
| 2011/0285652 | A1* | 11/2011 | Imamura | G06F 1/1616 345/173 |
| 2014/0028865 | A1* | 1/2014 | Ohtaka | H04N 5/23203 348/211.4 |
| 2014/0028903 | A1* | 1/2014 | Ohtaka | H04N 5/2252 348/373 |
| 2014/0101535 | A1* | 4/2014 | Kim | G06F 3/1431 715/234 |
| 2014/0184628 | A1* | 7/2014 | Lee | G06F 3/1423 345/545 |
| 2014/0320746 | A1* | 10/2014 | Sato | H04N 5/64 348/725 |
| 2014/0361980 | A1 | 12/2014 | Iwaki et al. | |
| 2015/0009128 | A1 | 1/2015 | Matsumoto | |
| 2015/0022515 | A1 | 1/2015 | Ikeda et al. | |
| 2015/0022561 | A1 | 1/2015 | Ikeda et al. | |
| 2015/0035777 | A1 | 2/2015 | Hirakata et al. | |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2003-195973 | 7/2003 |
| JP | 2004-103957 A | 4/2004 |
| JP | 2004-273614 A | 9/2004 |
| JP | 2004-273732 A | 9/2004 |
| JP | 2014-035496 | 2/2014 |
| JP | 2014-035496 A | 2/2014 |
| WO | WO-2004/114391 | 12/2004 |

OTHER PUBLICATIONS

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Ikeda.T et al., "Full-Functional System Liquid Crystal Display Using CG-Silicon Technology", SID Digect '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.

Takahasi.M et al., "Theoretical Analysis of IGZO Transparent Amorphous Oxide Semiconductor", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor", Science, May 23, 2003, vol. 300, No. 5623, pp. 1269-1272.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation with Ultraviolet Lamp", Journal of Sol-Gel Science and Technology, 2003, vol. 26, pp. 181-184.

Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films", Appl. Phys. Lett. (Applied Physicals Letters) , Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Tsuda.K et al., "Ultra Low Power Consumption Technologies for Mobile TFT-LCDs", IDW '02 : Proceedings of the 9th International Display Workshops, Dec. 4, 2002, pp. 295-298.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure", IEDM 09: Technical Digest of International Electron Devices Meeting, Dec. 7, 2009, pp. 191-194.

(56) References Cited

OTHER PUBLICATIONS

Kurokawa.Y et al., "UHF RFCPUS on Flexible and Glass Substrates for Secure RFID Systems", Journal of Solid-State Circuits, 2008, vol. 43, No. 1, pp. 292-299.
Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.
Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.
Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.
Jin.D et al., "65.2:Distinguished Paper:World-Largest (6.5") Flexible Full Color Top Emission AMOLED Display on Plastic Film and its Bending Properties", SID Digest '09 : SID International Symposium Digest of Technical Papers, May 31, 2009, pp. 983-985.
Sakata.J et al., "Development of 4.0-in. AMOLED Display With Driver Circuit Using Amorphous In—Ga—Zn-Oxide TFTs", IDW '09 : Proceedings of the 16th International Display Workshops, 2009, pp. 689-692.
Park.J et al., "Amorphous Indium-Gallium-Zinc Oxide TFTs and Their Application for Large Size AMOLED", AM-FPD '08 Digest of Technical Papers, Jul. 2, 2008, pp. 275-278.
Park.S et al., "Challenge to Future Displays: Transparent AM-OLED Driven by Peald Grown ZnO TFT", IMID '07 Digest, 2007, pp. 1249-1252.
Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.
Osada.T et al., "Development of Driver-Integrated Panel Using Amorphous In—Ga—Zn-Oxide TFT", AM-FPD '09 Digest of Technical Papers, Jul. 1, 2009, pp. 33-36.
Hirao.T et al., "Noval Top-Gate Zinc Oxide Thin-Film Transistors (ZnO TFTs) for AMLCDs", J. Soc. Inf. Display (Journal of the Society for Information Display), 2007, vol. 15, No. 1, pp. 17-22.
Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.
Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.
Ohara.H et al., "21.3:4.0 in. QVGA AMOLED Display Using In—Ga—Zn-Oxide TFTs With a Novel Passivation Layer", SID Digest '09 : SID International Symposium Digest of Technical Papers, May 31, 2009, pp. 284-287.
Miyasaka.M, "SUFTLA Flexible Microelectronics on Their Way to Business", SID Digest '07 : SID International Symposium Digest of Technical Papers, 2007, vol. 38, pp. 1673-1676.
Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.
Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.
Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.
Lee.H et al., "Current Status of, Challenges to, and Perspective View of AM-OLED", IDW '06 : Proceedings of the 13th International Display Workshops, Dec. 7, 2006, pp. 663-666.
Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.
Nakamura.M, "Synthesis of Homologous Compound with New Long-Period Structure", NIRIM Newsletter, Mar. 1, 1995, vol. 150, pp. 1-4.
Kikuchi.H et al., "Polymer-Stabilized Liquid Crystal Blue Phases", Nature Materials, Sep. 2, 2002, vol. 1, pp. 64-68.
Kimizuka.N et al., "SPINEL,YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures over 1000° C.", Journal of Solid State Chemistry, 1985, vol. 60, pp. 382-384.
Kitzerow.H et al., "Observation of Blue Phases in Chiral Networks", Liquid Crystals, 1993, vol. 14, No. 3, pp. 911-916.
Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.
Meiboom.S et al., "Theory of the Blue Phase of Cholesteric Liquid Crystals", Phys. Rev. Lett. (Physical Review Letters), May 4, 1981, vol. 46, No. 18, pp. 1216-1219.
Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.
Orita.M et al., "Mechanism of Electrical Conductivity of Transparent InGaZnO4", Phys. Rev. B (Physical Review. B), Jan. 15, 2000, vol. 61, No. 3, pp. 1811-1816.
Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.
Janotti.A et al., "Native Point Defects in ZnO", Phys. Rev. B (Physical Review. B), Oct. 4, 2007, vol. 76, No. 16, pp. 165202-1-165202-22.
Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.
Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.
Janotti.A et al., "Oxygen Vacancies in ZnO", Appl. Phys. Lett. (Applied Physics Letters), 2005, vol. 87, pp. 122102-1-122102-3.
Oba.F et al., "Defect energetics in ZnO: A hybrid Hartree-Fock density functional study", Phys. Rev. B. (Physical Review. B), 2008, vol. 77, pp. 245202-1-245202-6.
Orita.M et al., "Amorphous transparent conductive oxide InGaO3(ZnO)m (m<4):a Zn4s conductor", Philosophical Magazine, 2001, vol. 81, No. 5, pp. 501-515.
Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.
Mo.Y et al., "Amorphous Oxide TFT Backplanes for Large Size AMOLED Displays", IDW '08 : Proceedings of the 6th International Display Workshops, Dec. 3, 2008, pp. 581-584.
Kim.S et al., "High-Performance oxide thin film transistors passivated by various gas plasmas", 214th ECS Meeting, 2008, No. 2317, ECS.
Clark.S et al., "First Principles Methods Using CASTEP", Zeitschrift fur Kristallographie, 2005, vol. 220, pp. 567-570.
Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

(56) References Cited

OTHER PUBLICATIONS

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.
Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.
Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

* cited by examiner

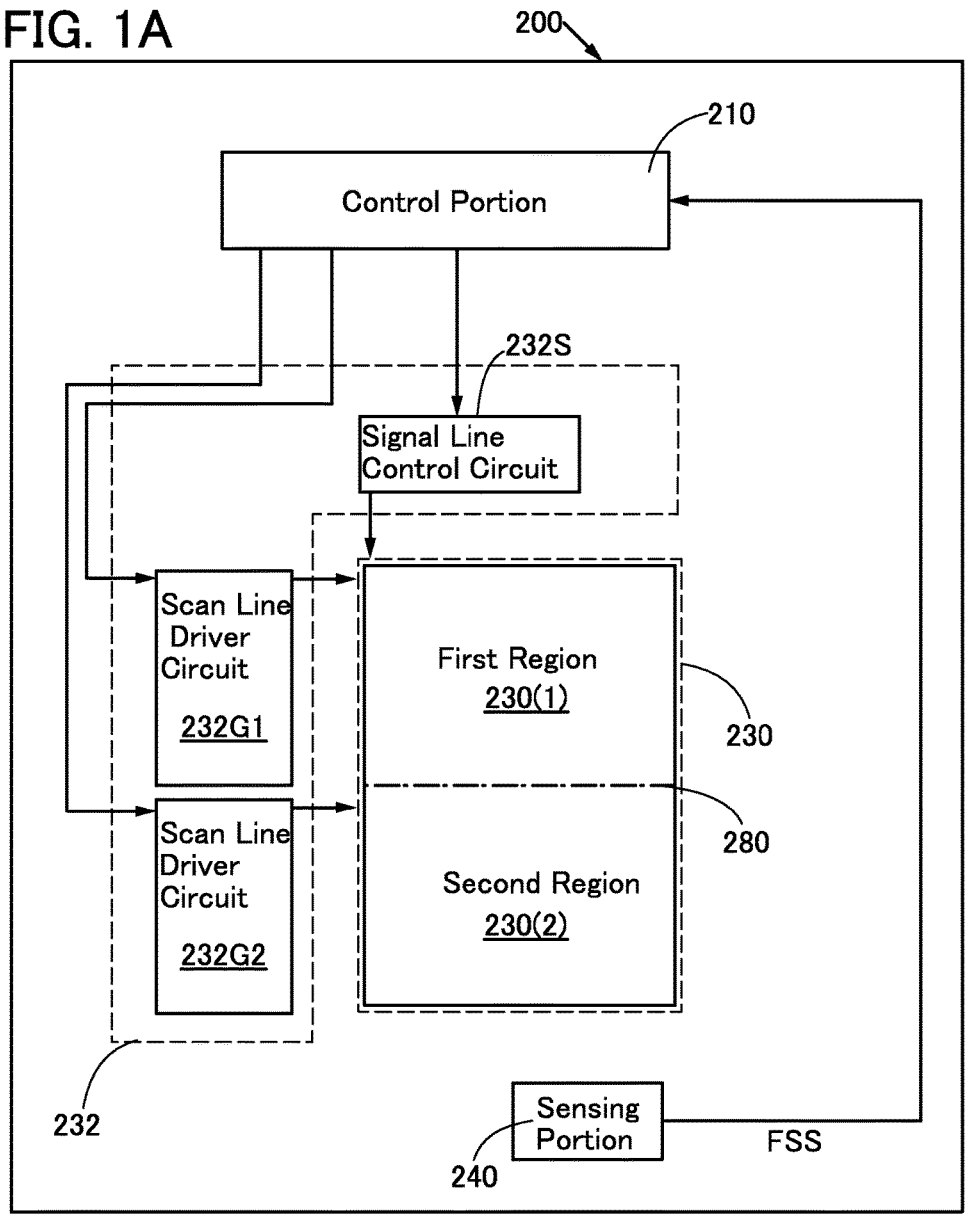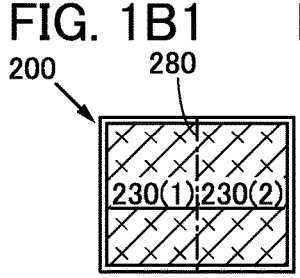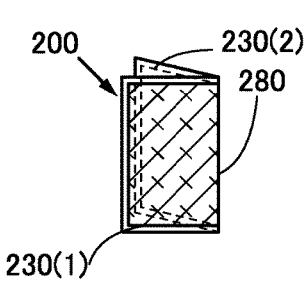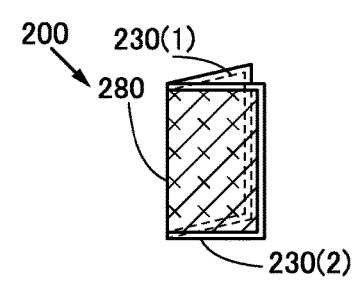

FIG. 2A
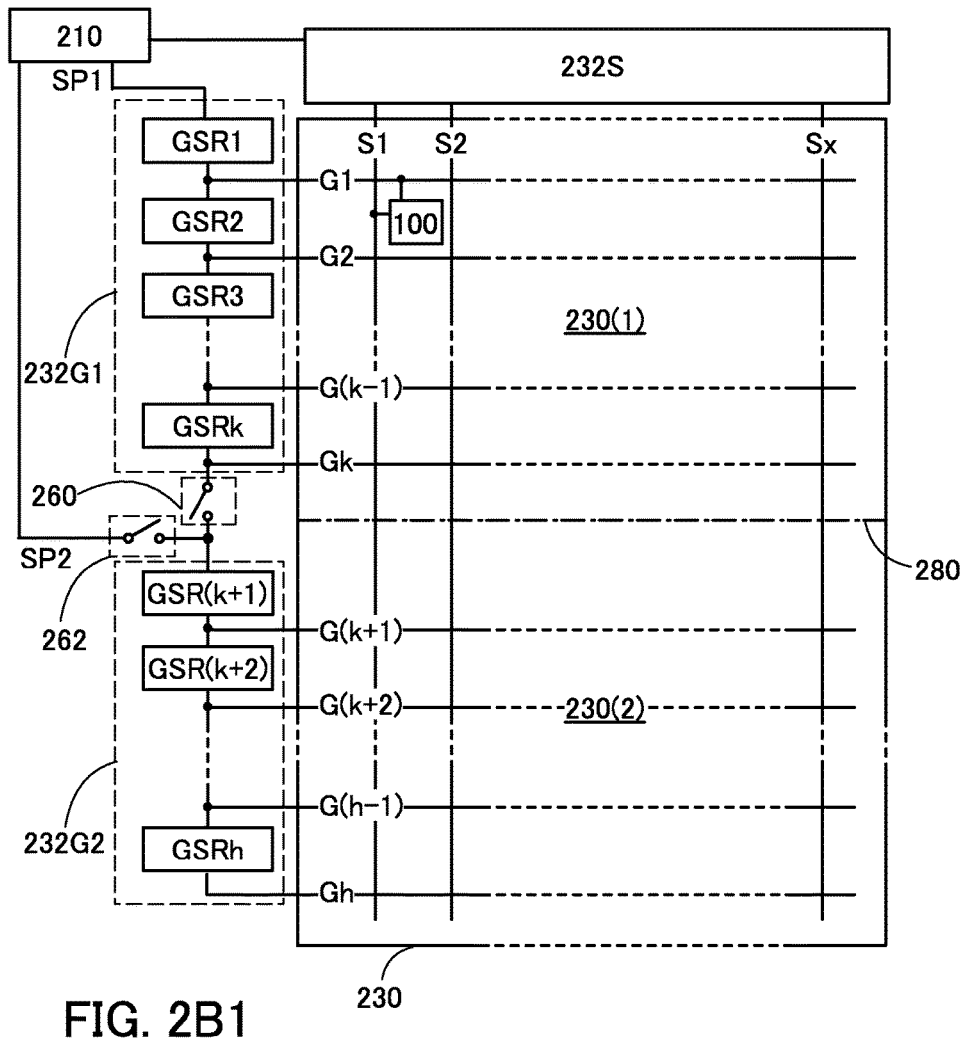
FIG. 2B1
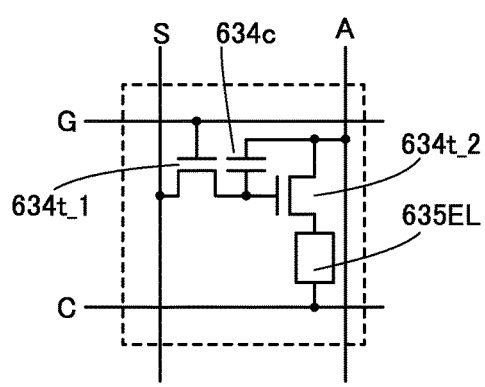
FIG. 2B2
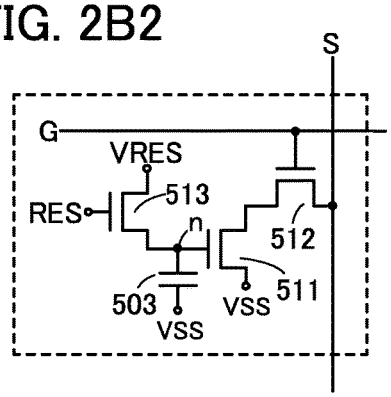

FIG. 5A
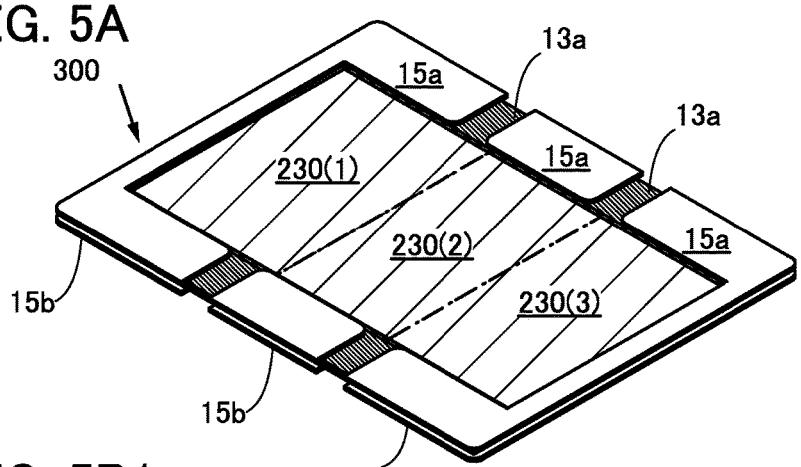
FIG. 5B1
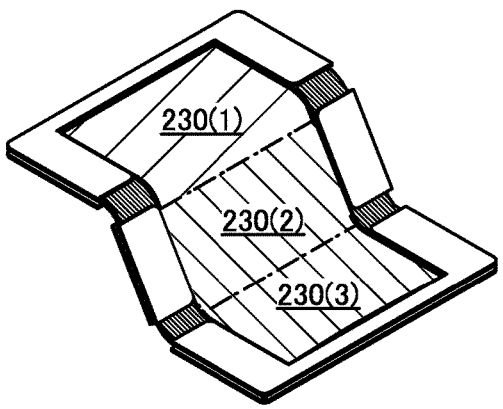
FIG. 5B2
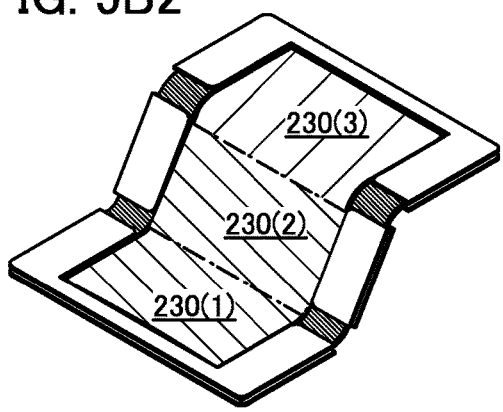
FIG. 5C1
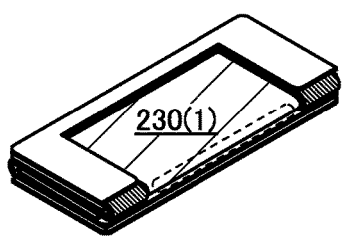
FIG. 5C2
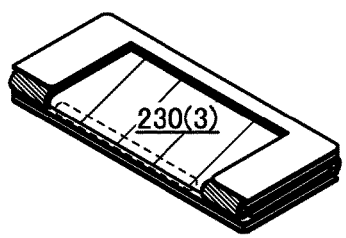
FIG. 5D
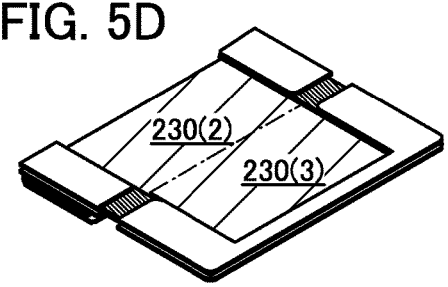

FIG. 6A
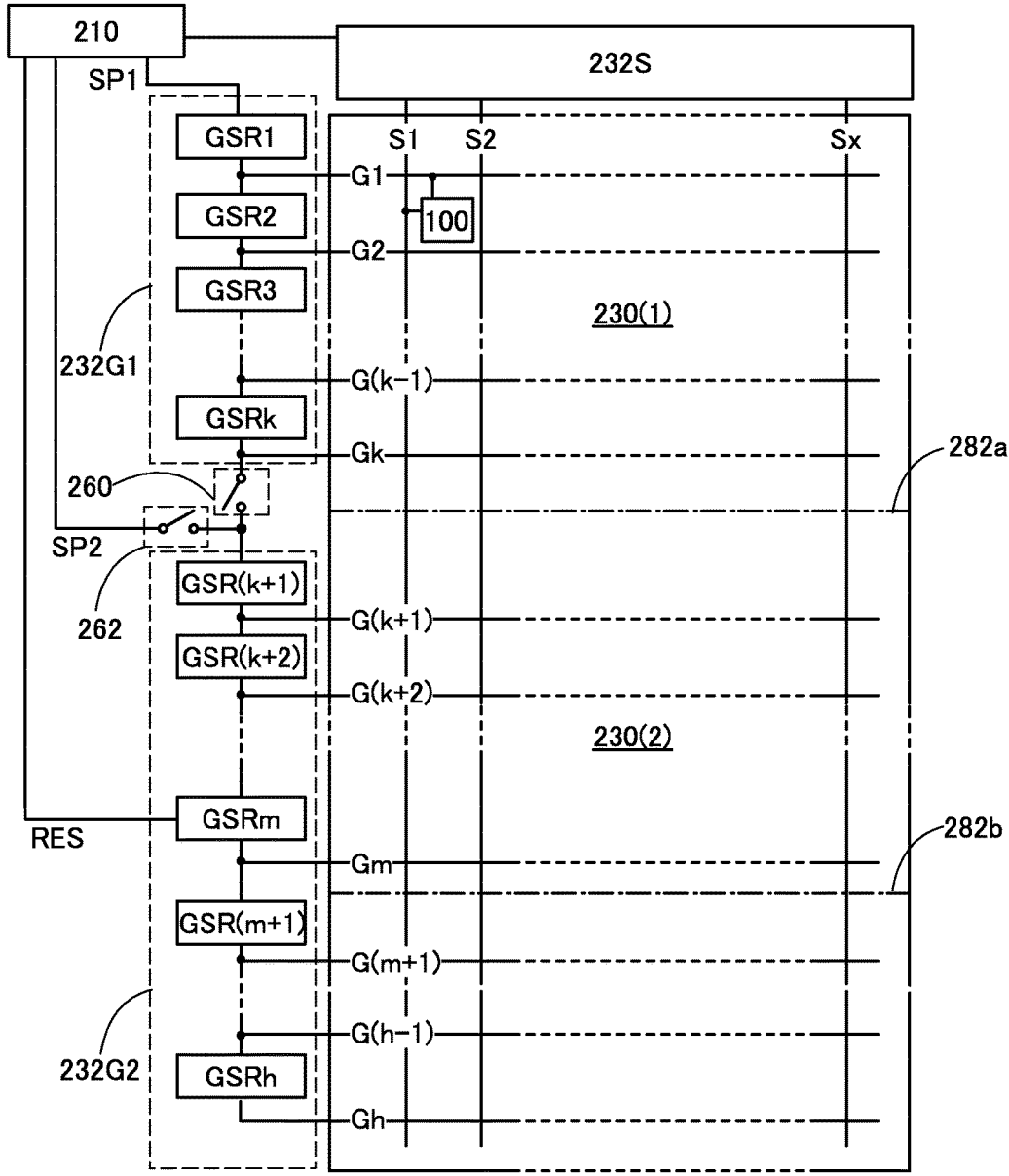
FIG. 6B1
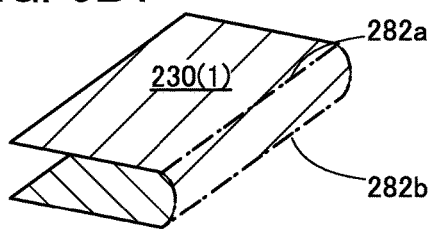
FIG. 6B2
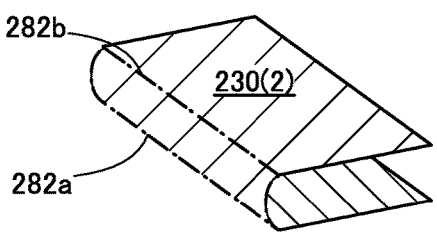

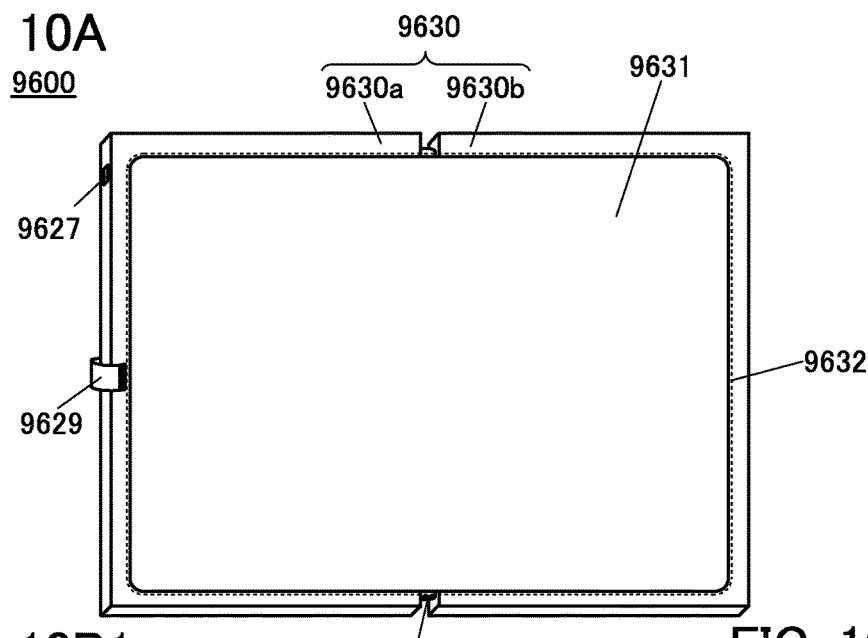
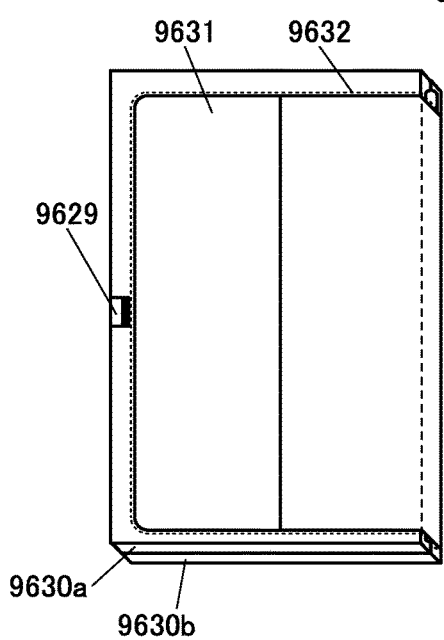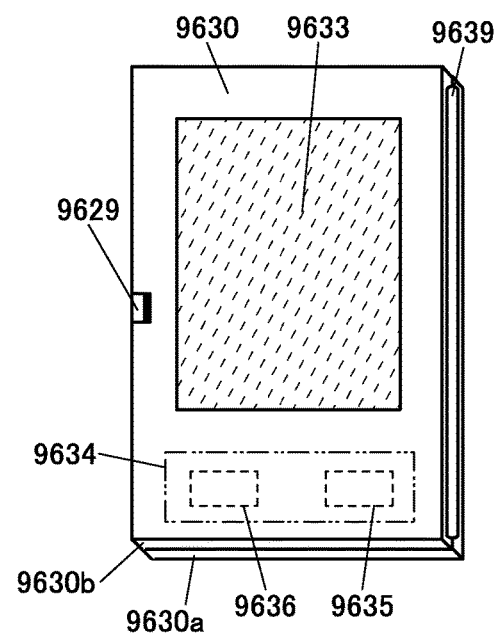
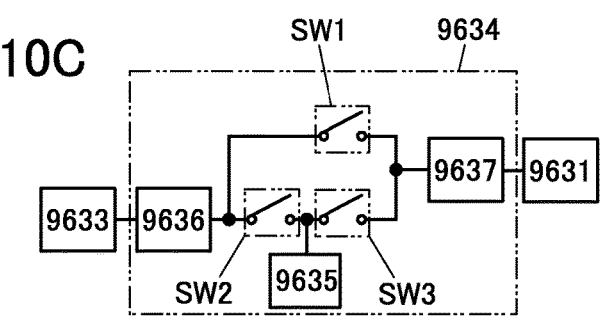

SEMICONDUCTOR DEVICE

BACKGROUND OF THE INVENTION

1. Field of the Invention

One embodiment of the present invention relates to an object, a process (including a method and a manufacturing method), a machine, a manufacture, or a composition of matter. In particular, one embodiment of the present invention relates to a semiconductor device, a display device, a light-emitting device, a driving method thereof, a controlling method thereof (including a program), a manufacturing method thereof, or the like.

In this specification, a semiconductor device includes all the devices that can function by utilizing electronic characteristics of a semiconductor in its category, and a semiconductor circuit is an example of the semiconductor device. Furthermore, an electrooptic device, a display device, an electric appliance, or the like may include a semiconductor device.

2. Description of the Related Art

Social infrastructures relating to means for transmitting data have advanced. This has made it possible to acquire, process, and send out many pieces and various kinds of data with the use of a data processor not only at home or office but also at visiting places.

Portable data processors have been actively developed in such a background.

For example, Patent Document 1 discloses a semiconductor device that can be folded while being carried and can be spread wide while being used. In addition, Patent Document 2 discloses a display device whose display portion can be bent.

REFERENCE

Patent Document 1: Japanese Published Patent Application No. 2003-195973
Patent Document 2: Japanese Published Patent Application No. 2014-035496

SUMMARY OF THE INVENTION

When the performance of a semiconductor device is evaluated, one of important points is low power consumption. In particular, in a semiconductor device such as a portable electronic device, high power consumption leads to reduction in continuous operating time; thus, reduction in power consumption is needed. In view of the above, an object of one embodiment of the present invention is to provide a low-power semiconductor device.

Alternatively, another object is to provide a highly portable semiconductor device. Alternatively, another object is to provide a novel semiconductor device.

The description of these objects does not disturb the existence of other objects. In one embodiment of the present invention, there is no need to achieve all the objects. Other objects will be apparent from and can be derived from the description of the specification, the drawings, the claims, and the like (also collectively referred to as "the specification and the like").

A semiconductor device in one embodiment of the present invention includes a foldable movable portion and has a function of operating one region in the movable portion and selectively stopping the operation of another region. As the region whose operation is selectively stopped, typically, a region that is not seen by a user when the semiconductor device is folded can be used. Power consumption can be reduced by selectively stopping the operation of one region in the movable portion. Specifically, the following structures can be employed, for example.

In one embodiment of the present invention, a semiconductor device includes a movable portion, a plurality of scan line driver circuits, and a control portion. The movable portion includes a plurality of regions driven by the plurality of scan line driver circuits. One of the scan line driver circuits is electrically connected to another one of the scan line driver circuits adjacent to the scan line driver circuit through a switch. The control portion can supply a start pulse to one scan line driver circuit selected from the plurality of scan line driver circuits. The movable portion can be folded between the plurality of regions.

In one embodiment of the present invention, a semiconductor device includes a movable portion, a first scan line driver circuit, a second scan line driver circuit, and a control portion. The movable portion includes a first region and a second region. The first region includes a plurality of transistors arranged in a matrix. The second region includes a plurality of transistors arranged in a matrix. The first scan line driver circuit includes first to k-th shift registers (k is an integer of two or more). The second scan line driver circuit includes (k+1)th to h-th shift registers (h is an integer of four or more, where (k+1)<h). The k-th shift register is connected to the (k+1)th shift register through a switch. The first scan line driver circuit can drive a plurality of transistors included in the first region. The second scan line driver circuit can drive a plurality of transistors included in the second region. The control portion can supply a start pulse to the first scan line driver circuit or the second scan line driver circuit. The movable portion can be folded between the first region and the second region.

In the above semiconductor device, the control portion preferably has a function of turning on the switch and supplying a start pulse to the first scan line driver circuit and a function of turning off the switch and supplying a start pulse to the second scan line driver circuit.

In the above semiconductor device, the control portion may be capable of turning on the switch and supplying a reset signal to any one of the (k+2)th to (h−1)th shift registers.

In one embodiment of the present invention, a semiconductor device includes a movable portion, a first scan line driver circuit, a second scan line driver circuit, a third scan line driver circuit, and a control portion. The movable portion includes a first region, a second region, and a third region. The first region includes a plurality of transistors arranged in a matrix. The second region includes a plurality of transistors arranged in a matrix. The third region includes a plurality of transistors arranged in a matrix. The first scan line driver circuit includes first to k-th shift registers (k is an integer of two or more). The second scan line driver circuit includes (k+1)th to h-th shift registers (h is an integer of four or more, where (k+1)<h). The third scan line driver circuit includes (h+1)th to t-th shift registers (t is an integer of six or more, where (h+1)<t). The k-th shift register is connected to the (k+1)th shift register through a first switch. The h-th shift register is connected to the (h+1)th shift register through a second switch. The first scan line driver circuit can drive a plurality of transistors included in the first region. The second scan line driver circuit can drive a plurality of transistors included in the second region. The third scan line driver circuit can drive a plurality of transistors included in the third region. The control portion has a function of turning on the first switch and supplying a start pulse to the first scan line driver circuit, a function of turning off the first switch, turning on the second switch, and supplying a start pulse to the second scan line driver circuit, and a function of turning off the first and second switches and supplying a start pulse to the third scan line driver circuit. The movable portion can be folded between the first region and the second region and between the second region and the third region.

The above semiconductor device includes an arithmetic portion that executes a program. The program may include a step of sensing whether one region in the movable portion is in contact with the other region in the movable portion, a step of determining the developed or folded state of the movable portion depending on the shape of a contact portion of the movable portion, and a step of instructing the control portion to supply the start pulse when the movable portion is in a folded state.

The above semiconductor device may include a display portion and/or a sensing portion of a touch sensor as the movable portion.

According to one embodiment of the present invention, a low-power semiconductor device can be provided. Alternatively, according to one embodiment of the present invention, a highly portable semiconductor device can be provided. Alternatively, according to one embodiment of the present invention, a novel semiconductor device can be provided.

The description of these effects does not disturb the existence of other effects. In one embodiment of the present invention, there is no need to obtain all the effects. Other effects will be apparent from and can be derived from the description of the specification, the drawings, the claims, and the like.

BRIEF DESCRIPTION OF THE DRAWINGS

In the accompanying drawings:

FIGS. 1A, 1B1, 1B2, and 1B3 are a block diagram and external schematic diagrams illustrating a semiconductor device in one embodiment of the present invention;

FIGS. 2A, 2B1, and 2B2 illustrate the structure of a semiconductor device in one embodiment of the present invention;

FIG. 3 illustrates the structure of a semiconductor device in one embodiment of the present invention;

FIGS. 5A, 5B1, 5B2, 5C1, 5C2, and 5D illustrate the structure of a semiconductor device in one embodiment of the present invention;

FIGS. 6A, 6B1, and 6B2 illustrate the structure of a semiconductor device in one embodiment of the present invention;

FIGS. 10A, 10B1, 10B2, and 10C illustrate one embodiment of an electronic device.

DETAILED DESCRIPTION OF THE INVENTION

Figure 3:
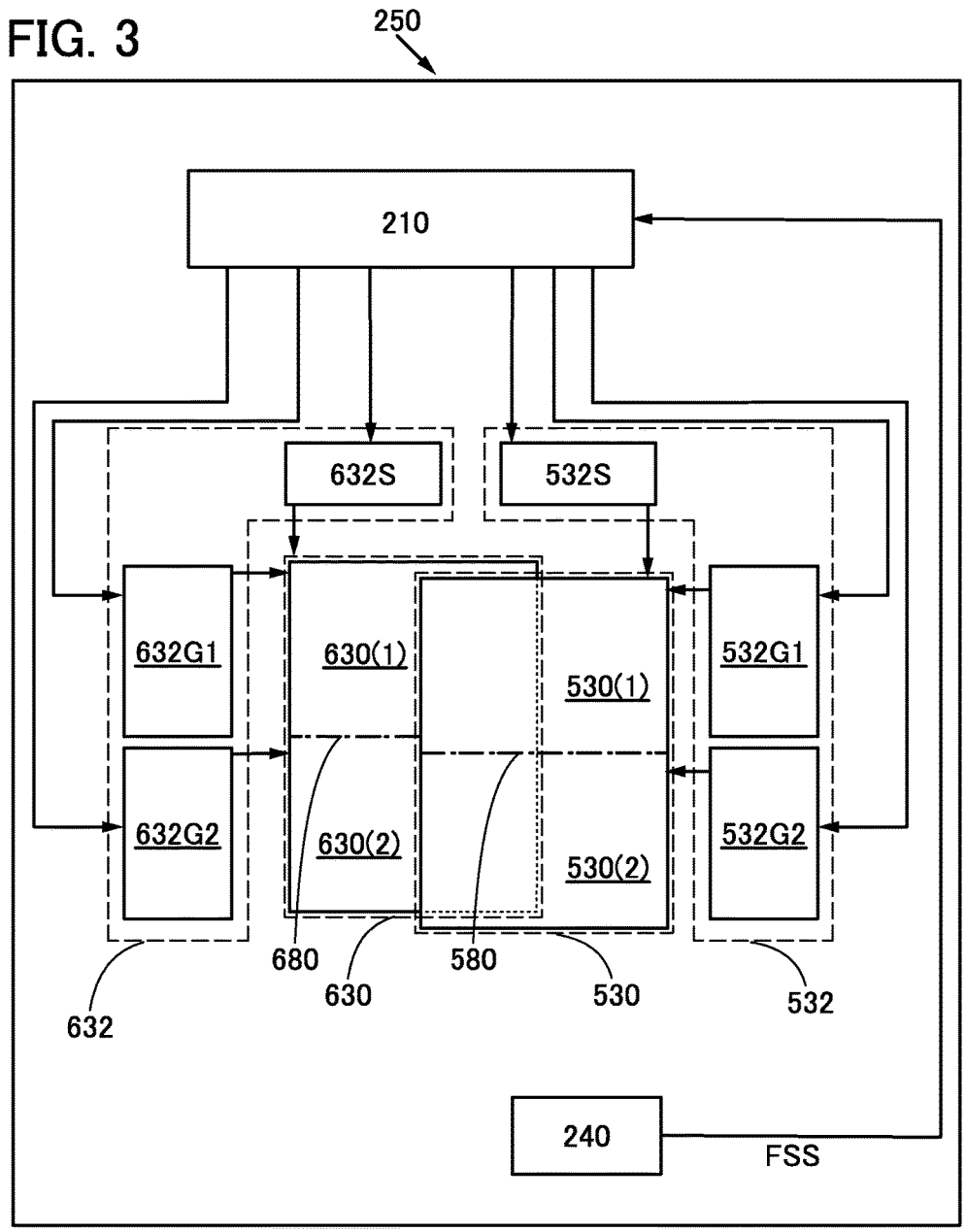

Examples of embodiments of the present invention will be described below with reference to the drawings. Note that the present invention is not limited to the following description. It will be readily appreciated by those skilled in the art that the mode and details can be modified in various ways without departing from the spirit and scope of the present invention. The present invention therefore should not be construed as being limited to the following description of the embodiments.

Note that the position, the size, the range, or the like of each structure illustrated in the drawings and the like is not accurately represented in some cases for easy understanding. Thus, the invention disclosed in this specification and the like is not necessarily limited to the position, size, range, or the like disclosed in the drawings and the like.

In structures of the present invention described below, the same portions or portions having similar functions are denoted by the same reference numerals in different drawings, and the description thereof is not repeated.

In this specification and the like, ordinal numbers such as "first" and "second" are used to avoid confusion among components, and thus do not limit the number of the components.

Embodiment 1

In this embodiment, the structure of a semiconductor device in one embodiment of the present invention is described with reference to FIGS. 1A, 1B1, 1B2, and 1B3, FIGS. 2A, 2B1, and 2B2, FIG. 3, FIG. 4, and FIGS. 5A, 5B1, 5B2, 5C1, 5C2, and 5D.

FIG. 1A is an example of a block diagram illustrating the structure of a semiconductor device in one embodiment of the present invention. Note that in this specification and the like, in a block diagram, circuits are classified by their functions and independent blocks are illustrated. However, it is difficult to classify actual circuits by their functions and, in some cases, one circuit has a plurality of functions. The arrangement of circuits is not limited to the arrangement illustrated in FIG. 1A, and can be set as appropriate.

A semiconductor device 200 in FIG. 1A includes a movable portion 230 that can be developed and folded, a driver circuit portion 232 that drives the movable portion 230, a control portion 210 that supplies a control signal of the driver circuit portion 232, and a sensing portion 240 that senses the developed or folded state of the movable portion 230.

The movable portion 230 includes a first region 230(1) and a second region 230(2) and can be folded between the first region 230(1) and the second region 230(2). In FIG. 1A, the movable portion 230 can be folded at a boundary 280 between the first region 230(1) and the second region 230(2). The first region 230(1) and the second region 230(2) each include a plurality of transistors arranged in a matrix. Each of the plurality of transistors is electrically connected to a display element, a photodiode, a passive element (e.g., a capacitor), or the like. In other words, the movable portion 230 has an active-matrix structure. In this specification and the like, a unit that includes one of the transistors arranged in a matrix and a passive element or a display element electrically connected to the transistor is also referred to as a unit circuit.

When the plurality of transistors are electrically connected to a plurality of display elements (e.g., light-emitting elements or liquid crystal elements) arranged in a matrix to control the operation of the display elements, the movable portion 230 can function as a display portion of the semiconductor device 200. In that case, one unit circuit corresponds to one pixel. Alternatively, when the plurality of transistors are electrically connected to a plurality of capacitors arranged in a matrix to form an active-matrix touch sensor, the movable portion 230 can function as a sensing portion of the touch sensor of the semiconductor device 200.

In the movable portion 230, an interval between unit circuits in the first region 230(1) is preferably almost the same as an interval between unit circuits in the second region 230(2). In particular, in the case where the movable portion 230 functions as a display portion, unit circuits (i.e., pixels) are preferably arranged in such a manner that an image is displayed across the first region 230(1) and the second region 230(2). For example, unit circuits are preferably arranged at the same interval from the first region 230(1) to the second region 230(2) to prevent a user from seeing the boundary 280 between the first region 230(1) and the second region 230(2).

An active-matrix panel applicable to the foldable movable portion 230 includes, for example, a flexible substrate and a plurality of unit circuits over the substrate. For example, the movable portion 230 can be bent with a curvature radius of greater than or equal to 1 mm and less than or equal to 100 mm with one surface on which an image can be displayed or sensing can be performed facing both inward and outward.

The driver circuit portion 232 includes a signal line control circuit 232S and a plurality of scan line driver circuits. The signal line control circuit 232S has a function of controlling signal input or signal reading to and from a display element or a passive element contained in one unit circuit selected from active-matrix unit circuits of the movable portion 230. The plurality of scan line driver circuits are electrically connected to each other through a switch. In FIG. 1A, the driver circuit portion 232 includes a scan line driver circuit 232G1 and a scan line driver circuit 232G2. The scan line driver circuit 232G1 has a function of supplying signals for controlling switching of a plurality of transistors included in the first region 230(1) of the movable portion 230. The scan line driver circuit 232G2 has a function of supplying signals for controlling switching of a plurality of transistors included in the second region 230(2) of the movable portion 230. The scan line driver circuit 232G1 is electrically connected to the scan line driver circuit 232G2 through an unillustrated switch. Note that the number of scan line driver circuits is not limited to that in FIG. 1A, and can be set optionally depending on the foldable number of the movable portion 230. For example, in the case where the movable portion 230 can be folded in three, the number of scan line driver circuits is three, and the scan line driver circuits are electrically connected to each other through a switch.

The sensing portion 240 has a function of sensing the folded state of the movable portion 230, specifically, the positional relationship between the first region 230(1) and the second region 230(2) in the folded state and supplying a fold sensing signal FSS to the control portion 210. A sensor (e.g., an acceleration sensor or a magnetic sensor (including a non-contact sensor)) can be used to sense the folded state.

For example, the sensing portion 240 is provided in one of the first region 230(1) and the second region 230(2) of the movable portion 230 or the vicinity thereof (e.g., over a housing for supporting the region), and a sign is provided in the other of the first region 230(1) and the second region 230(2) or the vicinity thereof. With such a structure, when the movable portion 230 is in a folded state, the sensing portion 240 is close to the sign or in contact with the sign. Thus, when the sensor of the sensing portion 240 senses the sign, the sensing portion 240 can sense the folded state of the movable portion 230 and the positional relationship between the regions in the folded state. Accordingly, the fold sensing signal FSS can be supplied to the control portion 210.

Note that in this specification and the like, a state in which a semiconductor device or a movable portion is folded means not only a state in which one region in the movable portion is in contact with the other region in the movable portion but also a state in which one region in the movable portion is close to the other region in the movable portion and the shortest distance therebetween is shorter than or equal to the distance that can be sensed by the sensor of the sensing portion 240.

A sensor that can identify the sign can be selected as the sensor of the sensing portion 240. Specifically, in the case where light is used as the sign, a photoelectric conversion element or the like can be used as the sensor. In the case where an electric wave is used as the sign, an antenna or the like can be used as the sensor. In the case where a magnet is used as the sign, a magnetic sensor or the like can be used the sensor.

The control portion 210 has a function of controlling supply of a data signal, a drive signal, a power supply potential, or the like to the signal line control circuit 232S, the scan line driver circuit 232G1, and the scan line driver circuit 232G2 included in the driver circuit portion 232. Note that although the drive signal is used to control the operation of the driver circuit portion 232 with the use of a pulse, the kind of drive signal needed for the operation varies depending on the structure of the driver circuit portion 232. Examples of drive signals include a start pulse and a clock signal that are used to control the operation of a shift register, and a latch signal used to control timing of data retention in a storage circuit.

In the semiconductor device 200 in one embodiment of the present invention, the control portion 210 has a function of supplying a drive signal based on the fold sensing signal FSS supplied from the sensing portion 240 to the scan line driver circuits 232G1 and 232G2. Specifically, when the movable portion 230 is in a developed state (i.e., the fold sensing signal FSS is not supplied to the control portion 210), a drive signal is supplied so that the scan line driver circuits 232G1 and 232G2 are driven. Thus, operation such as image display or sensing is performed on the entire surface of the movable portion 230 (i.e., the first region 230(1) and the second region 230(2)). On the other hand, in the case where the movable portion 230 is in a folded state (i.e., the fold sensing signal FSS is supplied to the control portion 210), a drive signal is supplied so that one of the scan line driver circuits 232G1 and 232G2 is driven. Thus, operation of a region in the movable portion 230 that is not seen in the folded state can be stopped. Accordingly, power for driving the region that is not seen can be reduced, so that the power consumption of the semiconductor device 200 can be reduced.

FIG. 1B1 illustrates a state in which the first region 230(1) and the second region 230(2) in the movable portion 230 of the semiconductor device 200 are developed on the same plane. In that case, operation is performed on the entire surface of the movable portion 230. FIGS. 1B2 and 1B3 each illustrate a state in which the movable portion 230 of the semiconductor device 200 is folded at the boundary 280. In that case, operation is performed on one of the first region 230(1) and the second region 230(2) in the movable portion 230, and operation is stopped in the other of the first region 230(1) and the second region 230(2) in the movable portion 230. For example, in FIG. 1B2, operation is performed on the first region 230(1) and operation is stopped in the second region 230(2). In FIG. 1B3, operation is performed on the second region 230(2) and operation is stopped in the first region 230(1).

A specific method for operating the driver circuit portion 232 and the movable portion 230 is described with reference to FIGS. 2A, 2B1, and 2B2. FIG. 2A is a partial enlarged view of the scan line driver circuit 232G1, the scan line driver circuit 232G2, the signal line control circuit 232S, the first region 230(1), and the second region 230(2) in FIG. 1A.

The movable portion 230 includes a plurality of unit circuits 100 and wirings electrically connected to the unit circuits 100. Each of the unit circuits 100 is electrically connected to at least one scan line and one signal line.

In FIG. 2A, in the movable portion 230, the unit circuits 100 are arranged in a matrix of h rows (h is an integer of four or more, where (k+1)<h) by x columns (x is an integer of one or more), and signal lines S1 to Sx and scan lines G1 to Gh are arranged in the movable portion 230. Among the scan lines G1 to Gh, scan lines G1 to Gk (k is an integer of two or more) are arranged in the first region 230(1), and scan lines G(k+1) to Gh are arranged in the second region 230(2).

The scan line driver circuit 232G1 includes first to k-th shift registers (GSR1 to GSRk). A shift register (GSR) has a function of sequentially outputting a pulse signal from the first stage to the next stage in response to a clock signal and a start pulse and a function of outputting a pulse signal used to generate a gate signal to the scan line. The scan line driver circuit 232G1 has a function of outputting a pulse signal to the scan lines G1 to Gk electrically connected to the first to k-th shift registers. In other words, the scan line driver circuit 232G1 has a function of driving the unit circuits included in the first region 230(1).

The scan line driver circuit 232G2 includes (k+1)th to h-th shift registers (GSR(k+1) to GSRh) and has a function of outputting a pulse signal to the scan lines G(k+1) to Gh electrically connected to the (k+1)th to h-th shift registers. In other words, the scan line driver circuit 232G2 has a function of driving the unit circuit included in the second region 230(2).

The control portion 210 is electrically connected to the scan line driver circuit 232G1 and is electrically connected to the scan line driver circuit 232G2 through a switch 262. The scan line driver circuit 232G1 is electrically connected to the scan line driver circuit 232G2 through a switch 260. In addition, the control portion 210 has a function of supplying a start pulse to one of the scan line driver circuits 232G1 and 232G2 in response to the fold sensing signal FSS supplied from the sensing portion 240.

When the fold sensing signal FSS is not supplied to the control portion 210, the control portion 210 turns on the switch 260 and supplies a start pulse SP1 to the first shift register (GSR1). In that case, a pulse signal is supplied from the final shift register GSRk in the scan line driver circuit 232G1 to the first shift register GSR(k+1) in the scan line driver circuit 232G2. As a result, the unit circuits included in the first region 230(1) and the second region 230(2) are driven, and operation is performed on the entire surface of the movable portion 230.

In the case where the fold sensing signal FSS is supplied to the control portion 210, operation is performed on one of the first region 230(1) and the second region 230(2), and operation is stopped in the other of the first region 230(1) and the second region 230(2). For example, when operation is performed on the first region 230(1), the control portion 210 turns off the switch 260 and supplies the start pulse SP1 to the first shift register (GSR1). In that case, a start pulse is not supplied to the shift registers included in the scan line driver circuit 232G2; thus, operation is performed on only the first region 230(1) and operation is stopped in the second region 230(2). Consequently, power consumption can be lower than that when operation is performed on the entire surface of the movable portion 230.

When the fold sensing signal FSS is supplied to the control portion 210 and operation is performed on the second region 230(2), the control portion 210 turns off the switch 260, turns on the switch 262, and supplies a start pulse SP2 to the (k+1)th shift register (GSR(k+1)). In that case, a start pulse is not supplied to the shift registers included in the scan line driver circuit 232G1; thus, operation is performed on only the second region 230(2) and operation is stopped in the first region 230(1). Consequently, power consumption can be lower than that when operation is performed on the entire surface of the movable portion 230.

Note that in the folded state, a region to be operated can be selected optionally from the first region 230(1) and the second region 230(2). For example, the sensing portion 240 senses an upper region of the first region 230(1) and the second region 230(2), and the upper region can be selected as a region to be operated. Note that selection of a region to be operated is not limited thereto.

FIGS. 2B1 and 2B2 each illustrate a structure example of the unit circuit 100 included in the movable portion 230. FIG. 2B1 illustrates a structure example in which the unit circuit includes a light-emitting element and the movable portion 230 is used as a display portion. FIG. 2B2 illustrates a structure example in which the unit circuit includes a capacitor and the movable portion 230 is used as the sensing portion of the touch sensor.

The unit circuit in FIG. 2B1 functions as a pixel circuit and includes a transistor 634t_1, a transistor 634t_2, an EL element 635EL, and a capacitor 634c. A gate of the transistor 634t_1 is electrically connected to a scan line G. One of a source and a drain of the transistor 634t 1 is electrically connected to a signal line S. The other of the source and the drain of the transistor 634t 1 is electrically connected to one electrode of the capacitor 634c. A gate of the transistor 634t_2 is electrically connected to the one electrode of the capacitor 634c. One of a source and a drain of the transistor 634t 2 is electrically connected to the other electrode of the capacitor 634c. The other of the source and the drain of the transistor 634t 2 is electrically connected to one electrode of the EL element 635EL. The EL element 635EL includes a layer containing a light-emitting organic compound between a pair of electrodes.

In FIG. 2B1, the other electrode of the capacitor 634c and the one of the source and the drain of the transistor 634t_2 are electrically connected to a wiring A through which a power supply potential and a potential needed for light emission of the EL element 635EL can be supplied. Note that the potential of the wiring A may be constant or may be changed in a pulsed manner every certain period. The other electrode of the EL element 635EL is electrically connected to a wiring C through which a common potential can be supplied. The difference between the power supply potential and the common potential is larger than the emission start voltage of the EL element 635EL.

The unit circuit in FIG. 2B2 functions as a sensor circuit of an active touch sensor and includes a capacitor 503, a transistor 511, a transistor 512, and a transistor 513. A gate of the transistor 513 is electrically connected to a wiring RES. One of a source and a drain of the transistor 513 is electrically connected to a wiring to which VRES is applied.

The other of the source and the drain of the transistor 513 is electrically connected to one electrode of the capacitor 503 and a gate of the transistor 511. One of a source and a drain of the transistor 511 is electrically connected to one of a source and a drain of the transistor 512, and the other of the source and the drain of the transistor 511 is electrically connected to a wiring to which voltage VSS is applied. A gate of the transistor 512 is electrically connected to the scan line G, and the other of the source and the drain of the transistor 512 is electrically connected to the signal line S. The other electrode of the capacitor 503 is electrically connected to the wiring to which the voltage VSS is applied.

The operation of the sensor circuit in FIG. 2B2 is described. A potential for turning on the transistor 513 is applied to the wiring RES, and a potential based on the voltage VRES is thus applied to a node n to which the gate of the transistor 511 is connected. A potential for turning off the transistor 513 is then applied to the wiring RES, so that the potential of the node n is held. Then, mutual capacitance of the capacitor 503 is changed owing to the approach or contact of an object such as a finger; thus, the potential of the node n is changed from VRES.

In read operation, a potential for turning on the transistor 512 is applied to the scan line G. Current flowing through the transistor 511, that is, current flowing through the signal line S is changed in response to the potential of the node n. By detecting this current, the approach or contact of an object can be detected.

Note that in this embodiment, the semiconductor device may include a plurality of movable portions. For example, FIG. 3 illustrates a semiconductor device 250 including two movable portions.

The semiconductor device 250 includes a display portion 630 (a first movable portion), a sensing portion 530 (a second movable portion), a driver circuit portion 632 for driving the display portion 630, a driver circuit portion 532 for driving the sensing portion 530, the sensing portion 240, and the control portion 210.

The display portion 630 includes a first region 630(1) and a second region 630(2) and can be folded at a boundary 680 between the first region 630(1) and the second region 630(2). The display portion 630 further includes a pixel circuit as a unit circuit. The sensing portion 530 includes a first region 530(1) and a second region 530(2) and can be folded at a boundary 580 between the first region 530(1) and the second region 530(2). The sensing portion 530 further includes a sensor circuit as a unit circuit. The sensing portion 530 is provided to overlap with at least part of the display portion 630. The boundary 680 of the display portion 630 overlaps with the boundary 580 of the sensing portion 530.

The driver circuit portion 632 includes a signal line control circuit 632S, a scan line driver circuit 632G1, and a scan line driver circuit 632G2. The scan line driver circuit 632G1 has a function of controlling drive of the first region 630(1) in the display portion 630. The scan line driver circuit 632G2 can control drive of the second region 630(2) in the display portion 630. Details of drive of the display portion 630 are similar to those of the movable portion 230; thus, the above description can be referred to.

The driver circuit portion 532 includes a signal line control circuit 532S, a scan line driver circuit 532G1, and a scan line driver circuit 532G2. The scan line driver circuit 532G1 has a function of controlling drive of the first region 530(1) in the sensing portion 530. The scan line driver circuit 532G2 can control drive of the second region 530(2) in the sensing portion 530. Details of drive of the display portion 530 are similar to those of the movable portion 230; thus, the above description can be referred to.

The control portion 210 has a function of controlling supply of a data signal, a drive signal, and a power supply potential to the driver circuit portion 632 and the driver circuit portion 532. A control portion for controlling the supply of a data signal, a drive signal, and a power supply potential to the driver circuit portion 632 and a control portion for controlling the supply of a data signal, a drive signal, and a power supply potential to the driver circuit portion 532 may be separately provided.

The semiconductor device 250 can stop operation of one region in the display portion 630 and one region in the sensing portion 530 in response to the fold sensing signal FSS supplied from the sensing portion 240. Thus, a low-power semiconductor device can be obtained.

Note that in the folded state, a region in the display portion 630 whose operation is stopped overlaps with at least part of a region in the sensing portion 530 whose operation is stopped. Typically, in each of the display portion 630 and the sensing portion 530, the operation of a region that is not seen in the folded state is stopped.

Note that although the movable portion 230, the display portion 630, or the sensing portion 530 of the semiconductor device can be folded in two as described above, this embodiment is not limited thereto. Specifically, the movable portion 230, the display portion 630, or the sensing portion 530 can be folded in three. A larger foldable number leads to a smaller external shape in a folded state, resulting in higher portability.

Figure 4:
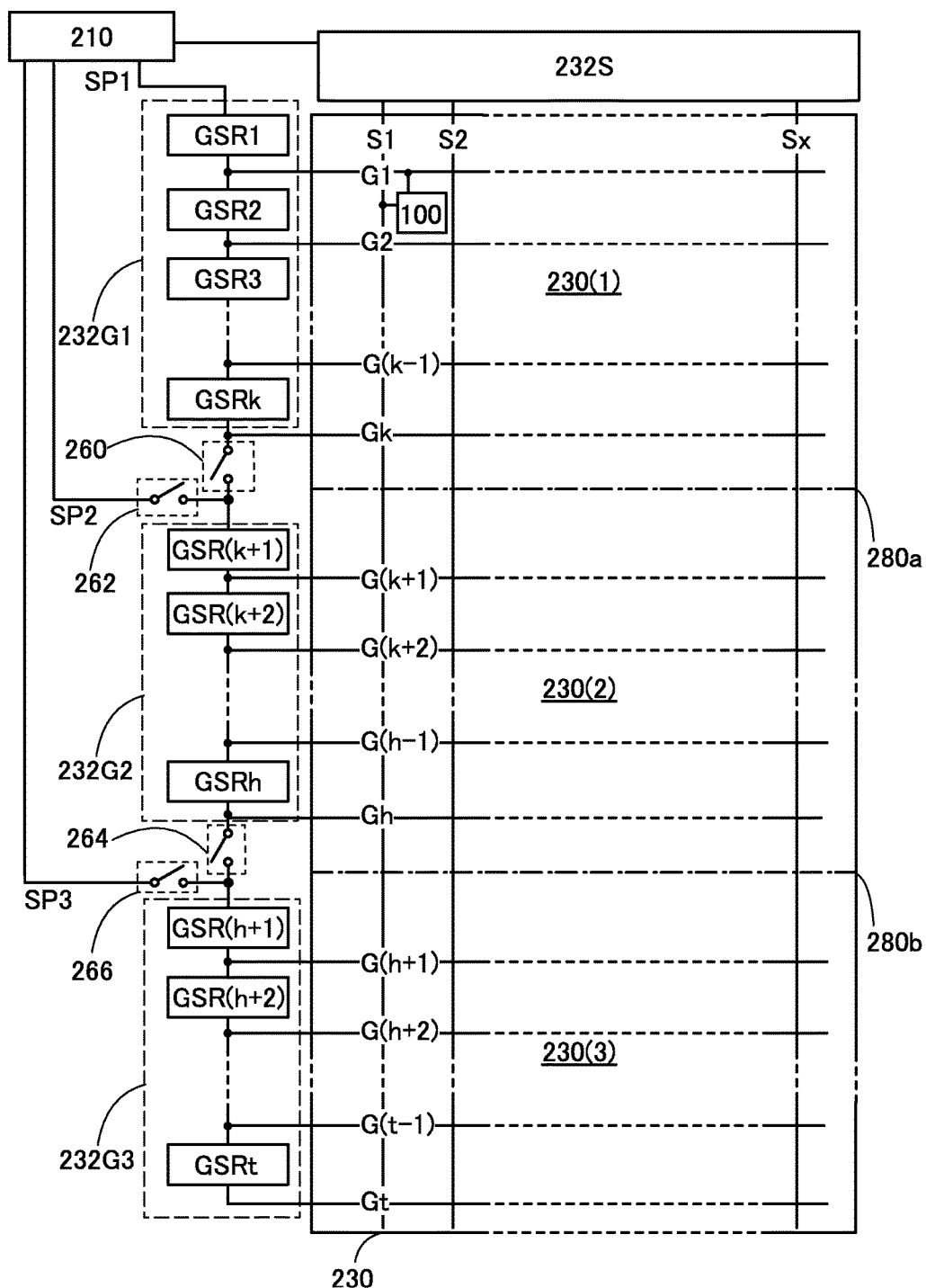
FIG. 4 illustrates the structure of a semiconductor device in one embodiment of the present invention.

FIG. 4 illustrates a structure example of a driver circuit for driving the movable portion 230 that can be folded in three. In FIG. 4, the movable portion 230 can be folded at a boundary 280a between the first region 230(1) and the second region 230(2) and a boundary 280b between the second region 230(2) and a third region 230(3). In the movable portion 230 of FIG. 4, the unit circuits 100 are arranged in a matrix of t rows (t is an integer of six or more, where (h+1)<t) by x columns, and the signal lines S1 to Sx and scan lines G1 to Gt are arranged in the movable portion 230. Among the scan lines G1 to Gt, the scan lines G1 to Gk are arranged in the first region 230(1), and the scan lines G(k+1) to Gh are arranged in the second region 230(2), and scan lines G(h+1) to Gt are arranged in the third region 230(3).

Even when the movable portion 230 can be folded in three, a driving method similar to the driving method of the movable portion that can be folded in two can be used. In other words, when a start pulse is selectively supplied to one scan line driver circuit selected from the plurality of scan line driver circuits, operation can be performed on a given region in the movable portion 230 and the operation of the other regions can be stopped. By stopping the operation of part of the movable portion 230, the power consumption of the semiconductor device can be reduced. A specific driving method is described below.

The scan line driver circuit 232G1 includes the first to k-th shift registers (GSR1 to GSRk) and has a function of outputting a pulse signal to the scan lines G1 to Gk electrically connected to the first to k-th shift registers. The scan line driver circuit 232G2 includes the (k+1)th to h-th shift registers (GSR(k+1) to GSRh) and has a function of outputting a pulse signal to the scan lines G(k+1) to Gh electrically connected to the (k+1)th to h-th shift registers. The scan line driver circuit 232G3 includes the (h+1)th to t-th shift registers (GSR(h+1) to GSRt) and has a function of outputting a pulse signal to the scan lines G(h+1) to Gt electrically connected to the (h+1)th to t-th shift registers.

The control portion 210 is electrically connected to the scan line driver circuit 232G1, is electrically connected to the scan line driver circuit 232G2 through the switch 262, and is electrically connected to the scan line driver circuit 232G3 through a switch 266. The scan line driver circuit 232G1 is electrically connected to the scan line driver circuit 232G2 through the switch 260. The scan line driver circuit 232G2 is electrically connected to the scan line driver circuit 232G3 through a switch 264. In addition, the control portion 210 has a function of supplying a start pulse to one scan line driver circuit selected from the scan line driver circuits 232G1 to 232G3 in response to the fold sensing signal FSS supplied from the sensing portion 240.

In the case where the fold sensing signal FSS is not supplied to the control portion 210, the control portion 210 turns on the switches 260 and 264 and supplies the start pulse SP1 to the first shift register (GSR1). As a result, the unit circuits included in the first region 230(1) to the third region 230(3) are driven, and operation is performed on the entire surface of the movable portion 230.

When the fold sensing signal FSS is supplied to the control portion 210, operation is performed on one or two of the first region 230(1) to the third region 230(3), and operation is stopped in at least one of the first region 230(1) to the third region 230(3). For example, in the case where operation is performed on the first region 230(1) and operation is stopped in the second region 230(2) and the third region 230(3), the control portion 210 turns off the switch 260 and selectively supplies the start pulse SP1 to the first shift register (GSR1). In the case where operation is performed on the first region 230(1) and the second region 230(2) and operation is stopped in the third region 230(3), the control portion 210 turns on the switch 260, turns off the switches 262 and 264, and selectively supplies the start pulse SP1 to the first shift register (GSR1).

In the case where operation is performed on the second region 230(2) and operation is stopped in the first region 230(1) and the third region 230(3), the control portion 210 turns on the switch 262, turns off the switch 264, and selectively supplies the start pulse SP2 to the (k+1)th shift register (GSR(k+1)). In the case where operation is performed on the second region 230(2) and the third region 230(3) and operation is stopped in the first region 230(1), the control portion 210 turns on the switches 262 and 264 and selectively supplies the start pulse SP2 to the (k+1)th shift register (GSR(k+1)). In the case where operation is performed on the third region 230(3) and operation is stopped in the first region 230(1) and the second region 230(2), the control portion 210 turns on the switch 266 and selectively supplies a start pulse SP3 to the (h+1)th shift register (GSR(h+1)).

Consequently, the power consumption of a semiconductor device including the movable portion 230 that can be folded in three can be reduced.

FIGS. 5A, 5B1, 5B2, 5C1, 5C2, and 5D are perspective views of a semiconductor device 300 including the movable portion 230 that can be folded in three. FIG. 5A illustrates the semiconductor device 300 in a developed state. FIG. 5B1 illustrates the semiconductor device 300 that is bent so that the first region 230(1) is the uppermost surface. FIG. 5C1 illustrates the semiconductor device 300 in a folded state through the state in FIG. 5B1. FIG. 5B2 illustrates the semiconductor device 300 that is bent so that the third region 230(3) is the uppermost surface. FIG. 5C2 illustrates the semiconductor device 300 in a folded state through the state in FIG. 5B2. FIG. 5D illustrates the semiconductor device 300 in which the first region 230(1) is folded below the second region 230(2) so that the first region 230(1) overlaps with the second region 230(2).

The semiconductor device 300 includes a housing 15a, a housing 15b, and a panel including the movable portion 230 positioned between the housings 15a and 15b. The housing 15a has two spaces, and connection members 13a are provided in the spaces. The housing 15b has a space overlapping with the space of the housing 15a. The connection members 13a function as hinges in a folded state, and are provided in portions of the movable portion 230 to be folded (at a boundary between the first region 230(1) and the second region 230(2) and a boundary between the second region 230(2) and the third region 230(3)). Note that the connection member 13a may be provided on the housing 15b side, or may be provided on both the housing 15a side and the housing 15b side.

The housings 15a and 15b support the panel including the movable portion 230 to increase the mechanical strength of the panel. In addition, the housings 15a and 15b support the panel including the movable portion 230 to prevent or inhibit the panel from being broken. The housing 15a and/or the housing 15b may support the scan line driver circuits 232G1 to 232G3 and the signal line control circuit 232S. Such a structure can protect the driver circuits against external stress. The housing 15a and/or the housing 15b may support the sensing portion and/or the control portion.

Note that the housing that supports the panel including the movable portion 230 may be provided only on the operating side of the panel or a side opposite to the operating side. Only one of the housings 15a and 15b may support the panel. With such a structure, the semiconductor device can be reduced in size or weight.

Plastics, metal, an alloy, and/or rubber can be used for the housing 15a, the housing 15b, and the connection member 13a. Plastics, rubber, or the like is preferably used because a lightweight durable semiconductor device can be obtained. For example, silicone rubber may be used for the connection member 13a, and stainless steel or aluminum may be used for the housings 15a and 15b. Note that a material used for the connection member 13a preferably has higher flexibility than a material used for the housings 15a and 15b. In the case where the movable portion 230 is used as a display portion, to put connection members and housings on the display side, a light-transmitting material is used for a region that overlaps with a display region.

To fix the connection member and the housing, to fix the connection member and the panel including the movable portion 230, or to fix the housing and the panel including the movable portion 230, for example, an adhesive, a screw or pin, a clip, or the like can be used.

In the semiconductor device 300 in the developed state of FIG. 5A, the fold sensing signal FSS is not supplied from the sensing portion to the control portion, and the unit circuits included in the first region 230(1) to the third region 230(3) are driven to perform operation on the entire surface of the movable portion 230. In that case, it is possible to perform operation in a seamless wide region. Thus, highly browsable operation is possible. On the other hand, in the semiconductor device 300 in the folded state of FIGS. 5C1, 5C2, and 5D, power consumption can be reduced by stopping operation of at least one of the first region 230(1) to the third region 230(3). For example, as illustrated in FIG. 5C1, in the case where the semiconductor device 300 is folded in three with the first region 230(1) used as the uppermost surface, operation can be performed on the first region 230(1) and operation can be stopped in the second region 230(2) and the third region 230(3). As illustrated in FIG. 5C2, in the case where the semiconductor device 300 is folded in three with the third region 230(3) used as the uppermost surface, operation can be performed on the third region 230(3) and operation can be stopped in the first region 230(1) and second region 230(2). As illustrated in FIG. 5D, in the case where the first region 230(1) of the semiconductor device 300 is folded below the second region 230(2) so that the first region 230(1) overlaps with the second region 230(2), operation can be performed on the second region 230(2) and the third region 230(3) and operation can be stopped in the first region 230(1). Note that the method for folding the semiconductor device 300 is not limited to those in FIGS. 5A, 5B1, 5B2, 5C1, 5C2, and 5D, and can be set as appropriate depending on the usage.

When the operation of a region that is not seen by a user in a folded state is stopped as illustrated in FIGS. 5C1, 5C2, and 5D, the power consumption of the semiconductor device 300 can be reduced. In addition, folding the semiconductor device 300 in such a manner that part of the movable portion 230 faces inward can prevent damage and attachment of dirt to the region.

As described above, the semiconductor device in this embodiment includes a foldable movable portion and can consume less power by selectively stopping operation of part of the movable portion in a folded state. In addition, the semiconductor device can have high portability.

Note that one structure example described in this embodiment can be combined with another structure example described in this embodiment. In addition, any of the structures, methods, and the like described in this embodiment can be combined with any of the structures, methods, and the like described in the other embodiments as appropriate.

Embodiment 2

In this embodiment, an example of a method for driving a semiconductor device that is different from the semiconductor device in Embodiment 1 is described with reference to FIGS. 6A, 6B1, and 6B2. Specifically, a method for driving a semiconductor device when one or more scan lines are positioned in a portion of a movable portion to be bent. Note that for components whose functions or structures are similar to those in Embodiment 1, the description of Embodiment 1 can be referred to and is not repeated in some cases.

FIG. 6A illustrates structure examples of the control portion 210, the scan line driver circuit 232G1, the scan line driver circuit 232G2, the signal line control circuit 232S, and the movable portion 230 included in the semiconductor device in this embodiment.

The movable portion 230 includes the first region 230(1) and the second region 230(2) and can be folded so that a region from a boundary 282a to a boundary 282b has a curvature. The boundary 282a is positioned between the first region 230(1) and the second region 230(2). The boundary 282b is positioned in the second region 230(2). Among the scan lines G(k+1) to Gh arranged in the second region 230(2), scan lines G(k+1) to Gm (m is an integer of (k+2) or more and (h−1) or less) are arranged between the boundaries 282a and 282b.

In the case where the movable portion 230 is folded so that the region from the boundary 282a to the boundary 282b has a curvature, the region in the folded movable portion 230 is positioned on a side surface. For example, in the case where the movable portion 230 is folded so that the first region 230(1) is positioned upward as illustrated in FIG. 6B1, the first region 230(1) and a region between the boundaries 282a and 282b that is part of the second region 230(2) are seen by a user. Alternatively, in the case where the movable portion 230 is folded so that the second region 230(2) is positioned upward as illustrated in FIG. 6B2, the entire surface of the second region 230(2) is seen by the user and the first region 230(1) is not seen by the user.

In the semiconductor device in this embodiment, the control portion 210 has a function of supplying a reset signal (RES) to an m-th shift register (GSRm) included in the scan line driver circuit 232G2. The m-th shift register (GSRm) to which the reset signal is supplied outputs a pulse signal to the scan line Gm and stops output of a pulse signal to an (m+1)th shift register (GSR(m+1)). The scan line Gm is the final scan line among the scan lines arranged between the boundaries 282a and 282b. When a reset signal is supplied from the control portion 210 to the m-th shift register (GSRm), in the second region 230(2), operation can be performed on a region between the boundaries 282a and 282b (i.e., a region including the scan lines G(k+1) to Gm) and operation can be stopped in the other region (i.e., a region including scan lines G(m+1) to Gh).

For example, when the fold sensing signal FSS is supplied to the control portion 210 and operation is performed on the first region 230(1) and part of the second region 230(2), the control portion 210 turns on the switch 260 and supplies the start pulse SP1 to the first shift register (GSR1). The control portion 210 supplies the reset signal (RES) to the m-th shift register (GSRm) included in the scan line driver circuit 232G2. In that case, a pulse signal is not supplied to shift registers after the (m+1)th shift register included in the scan line driver circuit 232G2; thus, operation is performed on only the first region 230(1) and a region including the scan lines G(k+1) to Gm in the second region 230(2), and operation is stopped in a region including the scan lines G(m+1) to Gh in the second region 230(2). Accordingly, as illustrated in FIG. 6B1, operation can be performed on an upper surface (the first region 230(1)) and a side surface (a region between the boundaries 282a and 282b) of the semiconductor device and operation can be stopped in a lower surface (the other region in the second region 230(2)) of the semiconductor device. Consequently, power consumption can be lower than that when operation is performed on the entire surface of the movable portion 230.

Note that in the case where the fold sensing signal FSS is not supplied to the control portion 210 or in the case where the fold sensing signal FSS is supplied to the control portion 210 to stop operation in the first region 230(1) and perform operation on the whole of the second region 230(2), a method similar to that in Embodiment 1 can be used.

The power consumption of the semiconductor device in this embodiment can be reduced by stopping part of operation in a folded state. By supplying a reset signal to one shift register included in a scan line driver circuit, a movable portion connected to one scan line driver circuit can be divided into a region on which operation is performed and a region in which operation is stopped. Thus, it is possible to provide a semiconductor device driven by a driving method based on a variety of usage. For example, in a folded state, operation can be performed on an upper surface and a side surface of the movable portion and operation can be stopped in a lower surface of the movable portion.

Any of the structures, methods, and the like described in this embodiment can be combined with any of the structures, methods, and the like described in the other embodiments as appropriate.

Embodiment 3

In this embodiment, an example of a method for sensing a folded state in a sensing portion of a semiconductor device is described. Note that in this embodiment, an example in which a sensing portion of an active touch sensor is used as a movable portion of a semiconductor device is described.

In the case where a semiconductor device including a foldable movable portion is set in a folded state, part of the movable portion is in contact with or close to another part of the movable portion. In the semiconductor device 300 in FIGS. 5A, 5B1, 5B2, 5C1, 5C2, and 5D, in the developed state of FIG. 5A, any part of the movable portion 230 is not in contact with any other part of the movable portion 230. When the semiconductor device 300 is folded in three so that the first region 230(1) is the uppermost surface, as illustrated in FIG. 5C1, at least part of the second region 230(2) can be in contact with at least part of the third region 230(3). For example, one side of an end portion of the third region 230(3) can be linearly in contact with the second region 230(2) at the boundary with the first region 230(1). When the semiconductor device 300 is folded in three so that the third region 230(3) is the uppermost surface, as illustrated in FIG. 5C2, at least part of the first region 230(1) can be in contact with at least part of the second region 230(2). For example, one side of an end portion of the first region 230(1) can be linearly in contact with the second region 230(2) at the boundary with the third region 230(3). In other words, by changing the bend direction of the semiconductor device 300, the contact region (or vicinity) in the movable portion is changed. Thus, when the contact region (or vicinity) is sensed by a sensing circuit of the active touch sensor included in the movable portion 230, the folded state of the semiconductor device 300 and the positional relationship between the first region 230(1) to the third region 230(3) can be sensed.

In the case where the folded state of the semiconductor device 300 is sensed by the active touch sensor, the movable portion can serve as the sensing portion. The semiconductor device further includes an arithmetic portion, and the arithmetic portion can supply the fold sensing signal FSS to a control portion in response to a stored program.

Figure 7:
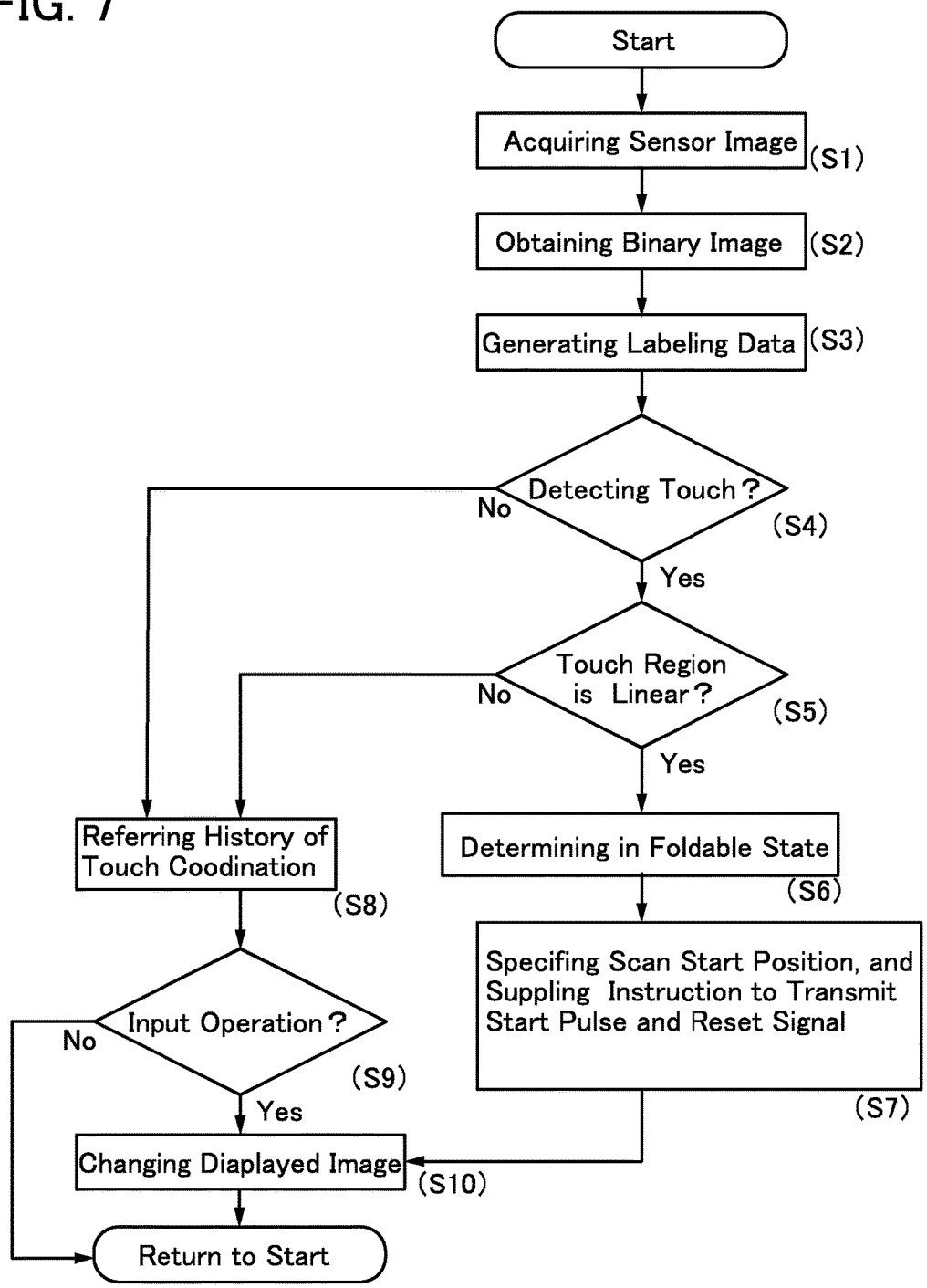
FIG. 7 is a flow chart of a program in one embodiment of the present invention.

FIG. 7 is a flow chart illustrating an example of a program stored in the arithmetic portion of the semiconductor device in this embodiment.

First, a sensor image showing the potential distribution of each unit circuit is acquired (S1). The potential distribution is represented as an image graylevel distribution. Next, a binary image is obtained by setting the threshold value of the obtained potential distribution (S2). The threshold value may be determined by a user of the semiconductor device or may be determined in the arithmetic portion.

Then, labeling data is generated based on the binary image (S3). By generating the labeling data, touch is detected and the touch position is determined (S4).

Various methods can be used as a labeling method. For example, a step of putting a label when the values of adjacent unit circuits are the same is performed in each unit circuit. Thus, positional data can be specified in the regions on which the same label is put. For example, the center of the regions on which the same label is put can be the positional data of the regions.

In this embodiment, in the case where touch is detected, whether the outline of the touch region (labeled outline) is linear is determined (S5). When a linear outline is obtained, the semiconductor device is determined to be in a folded state (S6). In addition, the fold direction, that is, a region in which the touch sensor should be operated is determined.

Note that in the case where the semiconductor device includes an active-matrix display that overlaps with the active touch sensor, a region of the display in which operation (image display) should be performed is also determined. Then, a scan start position (i.e., start pulse input position) in the scan line driver circuit of the touch sensor is specified, and an instruction to transmit a start pulse and a reset signal to the scan line driver circuit is supplied to the control portion (S7). At this time, in regions of the display other than regions to operate, the supply of the start pulse may be omitted or a clock signal with lower frequency than that of normal operation may be supplied instead of the reset signal. The instruction corresponds to the fold sensing signal FSS. After that, an image displayed on the display is changed (S10).

On the other hand, in the case where touch is detected and the touch outline is not linear, the history of touch coordinates is referred (S8), and whether the touch corresponds to input operation (e.g., tap, drag, swipe, or pinch-in operation) is determined from the history (S9). In the case where the touch corresponds to the input operation, an image displayed on the display is changed depending on the input operation (S10).

By using the program, the movable portion including the active touch sensor can serve as the sensing portion in a folded state. Note that the outline used for determination of the folded state is not limited to the linear outline, and can be set as appropriate depending on usage, a semiconductor device shape, or the like.

Any of the structures, methods, and the like described in this embodiment can be combined with any of the structures, methods, and the like described in the other embodiments as appropriate.

Embodiment 4

In this embodiment, the structure of a semiconductor device in one embodiment of the present invention is described with reference to FIG. 8 and FIGS. 9A to 9C.

Figure 8:
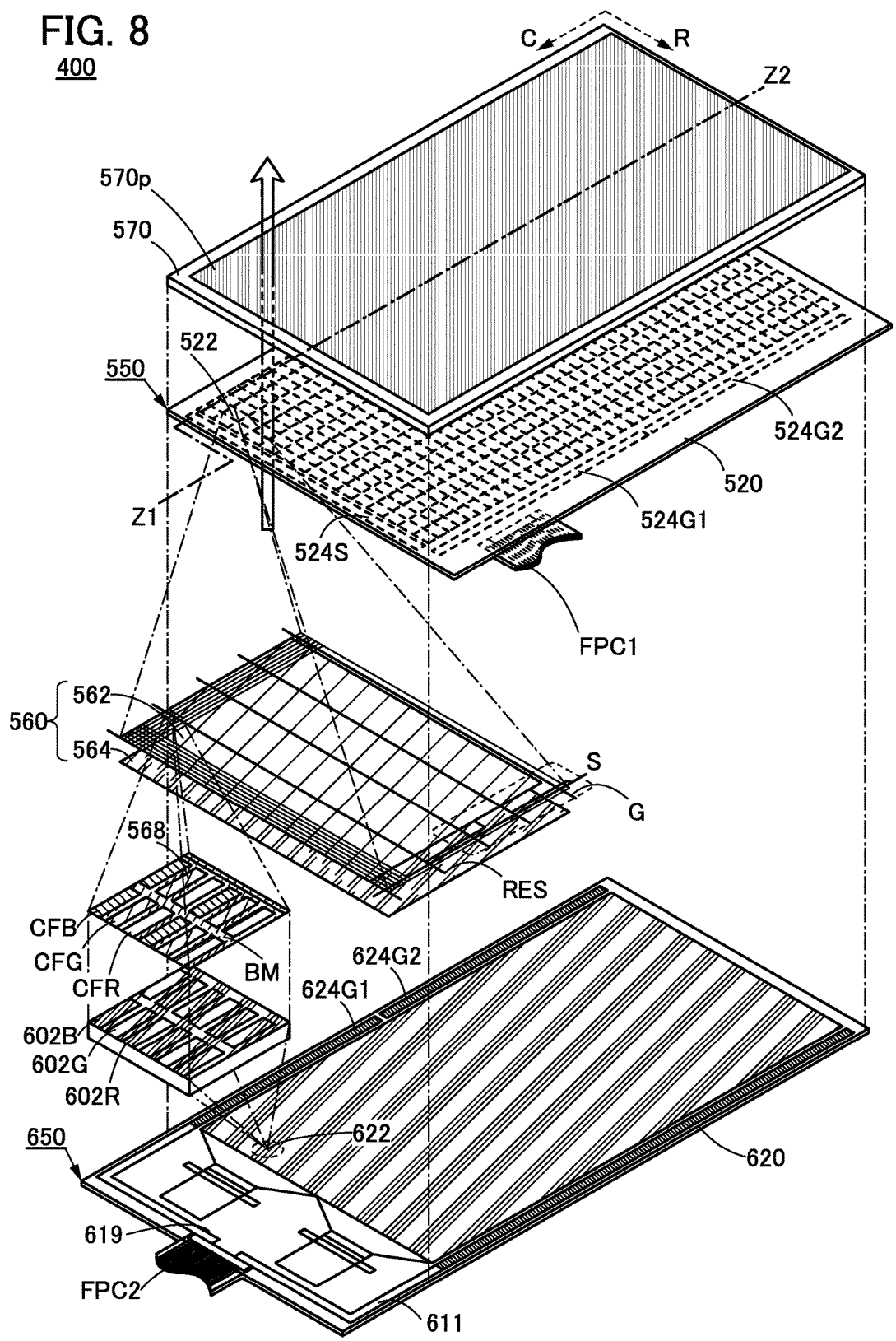
FIG. 8 is a projection view illustrating the structure of a semiconductor device according to an embodiment.

FIG. 8 is a projection view illustrating the structure of a semiconductor device 400 in one embodiment of the present invention. The semiconductor device 400 in this embodiment includes an active-matrix display portion and a sensing portion including an active touch sensor. The display portion and the sensing portion can be folded. Note that for convenience of description, part of a sensing unit 522 that corresponds to a unit circuit in the sensing portion and part of a pixel 622 included in the display portion are enlarged.

Figure 9A:
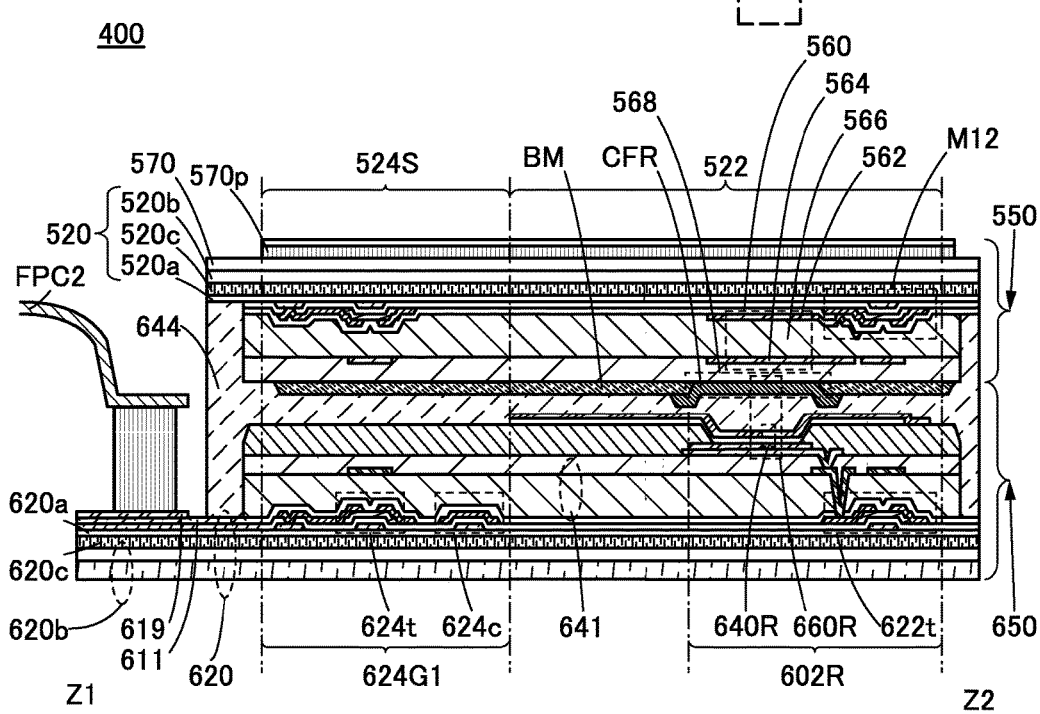
FIGS. 9A to 9C are cross-sectional views each illustrating the structure of a semiconductor device according to an embodiment.
Figure 9B:
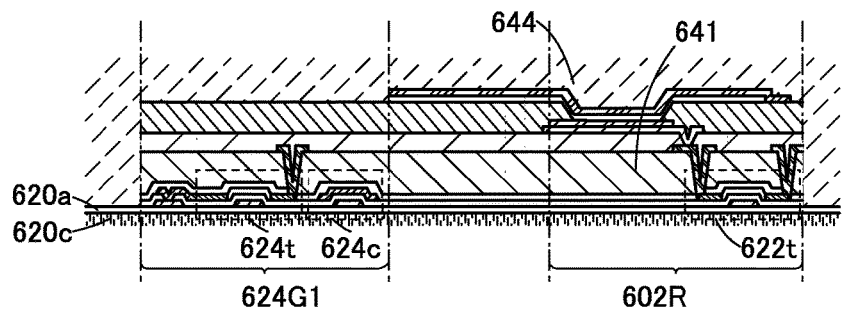
Figure 9C:
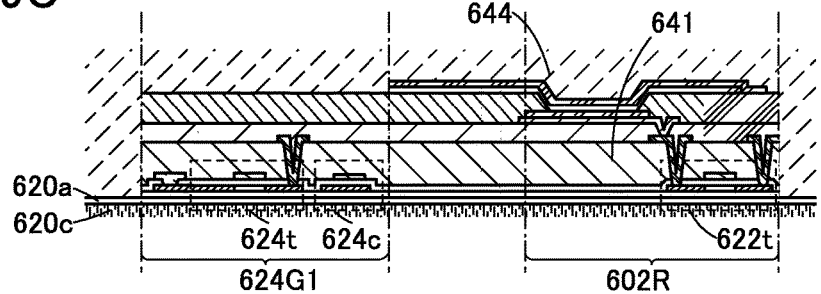

FIG. 9A is a cross-sectional view illustrating the cross-sectional structure of the semiconductor device 400 in one embodiment of the present invention taken along line Z1-Z2 in FIG. 8. FIGS. 9B and 9C are cross-sectional views each illustrating a modification example of part of the structure in FIG. 9A.

The semiconductor device 400 in this embodiment includes a display portion 650 and a sensing portion 550 that overlaps with the display portion 650 (see FIG. 8).

The sensing portion 550 includes a plurality of sensing units 522 arranged in a matrix. The sensing portion 550 further includes a scan line G, a control line RES, and the like that are electrically connected to a plurality of sensing units 522 arranged in a row direction (indicated by an arrow R in FIG. 8). The sensing portion 550 further includes the signal line S and the like that are electrically connected to a plurality of sensing units 522 arranged in a column direction (indicated by an arrow C in FIG. 8).

The sensing unit 522 includes sensor circuits. The sensor circuit includes at least a transistor. Specifically, for example, the sensor circuit can have the structure in FIG. 2B2. The sensor circuits are each electrically connected to the scan signal line G, the control line RES, the signal line S, or the like.

In this embodiment, the semiconductor device 400 includes a transistor and a capacitor 560 that includes an insulating layer 566 and a first electrode 562 and a second electrode 564 facing each other through the insulating layer 566 (see FIG. 9A).

The sensing unit includes a plurality of window portions 568 arranged in a matrix. The window portion 568 transmits visible light, and a light-blocking layer BM may be provided between the plurality of window portions 568.

A coloring layer overlaps with the window portion 568. The coloring layer transmits light of a predetermined color. Note that the coloring layer can be referred to as a color filter. For example, a coloring layer CFB transmitting blue light, a coloring layer CFG transmitting green light, or a coloring layer CFR transmitting red light can be used. Alternatively, a coloring layer transmitting yellow light or white light may be used.

The display portion 650 includes a plurality of pixels 622 arranged in a matrix. The pixels 622 overlap with the window portions 568 of the sensing portion 550. Note that the pixels 622 may be arranged at a higher integration degree than the sensing units 522.

The semiconductor device 400 in this embodiment includes the sensing portion 550 including a plurality of sensing units 522 arranged in a matrix and the display portion 650 including a plurality of pixels 622. Each of the plurality of sensing units includes the window portions 568 transmitting visible light. Each of the pixels 622 overlaps with the window portion 568, and a coloring layer is provided between the window portion 568 and the pixel 622. Each of the sensing units includes a switch that can reduce interference in another sensing unit.

With such a structure, data sensed by each sensing unit (sensing data) can be supplied together with the positional data of the sensing unit. In addition, sensing data can be supplied in relation to the positional data of the pixel for displaying an image. Thus, a novel semiconductor device that is highly convenient or reliable can be provided.

For example, the sensing portion 550 of the semiconductor device 400 can sense sensing data and supply the sensing data together with positional data. Specifically, a user of the semiconductor device 400 can perform a variety of input operation (e.g., tap, drag, swipe, or pinch-in operation) by using a finger or the like that is in contact with the sensing portion 550 as an object to be sensed (i.e., an object to operate the input operation).

The sensing portion 550 can sense a finger or the like that is close to or in contact with the sensing portion 550 and supply sensing data including a sensed position, path, or the like to the arithmetic portion. The arithmetic portion determines whether supplied data meets a predetermined condition based on a program or the like and then executes an instruction correlated with the supply of the fold sensing signal FSS or predetermined input operation. Thus, the user of the semiconductor device 400 can supply predetermined input operation by using a finger or the like and can make the arithmetic portion execute the instruction correlated with the predetermined input operation. Furthermore, the power consumption of the semiconductor device 400 can be reduced.

In addition to the above structure, the semiconductor device 400 can have the following structures.

The sensing portion 550 of the semiconductor device 400 is electrically connected to a plurality of scan line driver circuits and a signal line control circuit 524S. In this embodiment, the sensing portion 550 can be folded in two and is electrically connected to scan line driver circuits 524G1 and 524G2. Note that these driver circuits may be included in the sensing portion 550. In addition, the sensing portion 550 can be folded in three or more. In that case, the number of scan line driver circuits may be set depending on the number of regions to be folded. Furthermore, the sensing portion 550 may be electrically connected to a flexible printed circuit FPC1.

Similarly, the display portion 650 of the semiconductor device 400 is electrically connected to a plurality of scan line driver circuits. The display portion 650 can be folded to overlap with the sensing portion 550. As described above, the sensing portion 550 can be folded in two in this embodiment; thus, the display portion 650 can also be folded in two. Thus, the display portion 650 is electrically connected to two scan line driver circuits (scan line driver circuits 624G1 and 624G2). Note that in the case where the number of regions to be folded in the display portion 650 is increased, the number of scan line driver circuits can also be increased.

The scan line driver circuit may be provided in the display portion 650. In addition, a wiring 611 or a terminal 619 may be provided in the display portion 650. Furthermore, the display portion 650 may be electrically connected to a flexible printed circuit FPC2.

A protective layer 570 for preventing scratch generation may be provided to protect the semiconductor device 400. For example, a ceramic coat layer or a hard coat layer can be used as the protective layer 570. Specifically, a layer containing aluminum oxide or a UV curable resin can be used. In addition, an antireflection layer 570p that weakens external light intensity reflected on the semiconductor device 400 can be used. Specifically, a circular polarizing plate or the like can be used.

Components of the semiconductor device 400 are described below. Note that these components cannot be clearly distinguished and one component serves as another component or includes part of another component in some cases. For example, the sensing portion 550 that includes coloring layers to overlap with a plurality of window portions 568 serves as a color filter.

The semiconductor device 400 in this embodiment includes the sensing portion 550 and the display portion 650.

The sensing portion 550 includes the sensing unit 522, the scan line G, the signal line S, and a base material 520. Note that the sensing portion 550 may be formed by depositing a film for forming the sensing portion 550 over the base material 520 and processing the film. Alternatively, the sensing portion 550 may be formed by forming part of the sensing portion 550 over another base material and transferring the part of the sensing portion 550 to the base material 520.

The sensing unit 522 senses an object to be close to or in contact with the sensing unit 522 and supplies a sensing signal. For example, the sensing unit 522 senses capacitance, illuminance, magnetic force, a radio wave, pressure, or the like and supplies data based on the sensed physical value. Specifically, a capacitor, a photoelectric conversion element, a magnetic sensor element, a piezoelectric element, a resonator, or the like can be used as a sensor element.

The sensing unit 522 senses, for example, a change in capacitance between the sensing unit 522 and an object to be close to or in contact with the sensing unit 522. Specifically, a conductive film and a sensing circuit electrically connected to the conductive film may be used.

Note that in the air, when a finger or the like whose dielectric constant is larger than that of the air is close to the conductive film, capacitance between the finger and the conductive film is changed. The sensing unit 522 can sense the change in capacitance and supply sensing data. Specifically, the conductive film and a sensing circuit that includes a capacitor whose one electrode is connected to the conductive film can be used in the sensing unit 522.

For example, electric charge is distributed between the conductive film and the capacitor in accordance with the change in capacitance, so that voltage across the electrodes of the capacitor is changed. The change in voltage can be used as the sensing signal. Specifically, voltage across the electrodes of the capacitor 560 is changed when an object is close to a conductive film electrically connected to one electrode of the capacitor 560 (see FIG. 9A).

The sensing unit 522 includes a switch that can be turned on or off in response to a control signal. For example, a transistor M12 can be used as the switch.

In addition, a transistor that amplifies a sensing signal can be used in the sensing unit 522.

Transistors that can be formed through the same process can be used as the transistor that amplifies a sensing signal and the switch. Thus, the sensing portion 550 formed through a simplified manufacturing process can be provided.

The transistor includes a semiconductor layer. For example, a Group 4 element, a compound semiconductor, or an oxide semiconductor can be used for the semiconductor layer. Specifically, a semiconductor containing silicon, a semiconductor containing gallium arsenide, an oxide semiconductor containing indium, or the like can be used for the semiconductor layer.

Transistors can include semiconductor layers with a variety of crystallinity. For example, a semiconductor layer containing non-crystal, a semiconductor layer containing microcrystal, a semiconductor layer containing polycrystal, a semiconductor layer containing single crystal, and the like can be used. Specifically, a semiconductor layer containing amorphous silicon, a semiconductor layer containing polysilicon obtained by crystallization process such as laser annealing, a semiconductor layer formed by silicon on insulator (SOI) technique, and the like can be used.

The oxide semiconductor used for the semiconductor layer preferably includes a film represented by an In-M-Zn oxide that contains at least indium (In), zinc (Zn), and M (metal such as Al, Ga, Ge, Y, Zr, Sn, La, Ce, or Hf), for example. Alternatively, both In and Zn are preferably contained.

As a stabilizer, gallium (Ga), tin (Sn), hafnium (Hf), aluminum (Al), zirconium (Zr), or the like can be used. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be used.

As an oxide semiconductor included in an oxide semiconductor film, any of the followings can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, an In—Ga—Zn-based oxide means an oxide containing In, Ga, and Zn as its main components and there is no limitation on the ratio of In:Ga:Zn. The In—Ga—Zn-based oxide may contain another metal element in addition to In, Ga, and Zn.

A conductive material can be used for a wiring such as the scan line G, the control line RES, or the signal line S. For example, an inorganic conductive material, an organic conductive material, metal, conductive ceramics, or the like can be used for the wiring.

Specifically, a metal element selected from aluminum, gold, platinum, silver, chromium, tantalum, titanium, molybdenum, tungsten, nickel, iron, cobalt, yttrium, zirconium, palladium, and manganese; an alloy including any of the above metal elements; an alloy including any of the above metal elements in combination; or the like can be used for the wiring. One or more elements selected from aluminum, chromium, copper, tantalum, titanium, molybdenum, and tungsten are preferably contained. In particular, an alloy of copper and manganese is suitably used in microfabrication with the use of wet etching.

For example, any of the following structures can be used: a two-layer structure in which a titanium film is stacked over an aluminum film; a two-layer structure in which a titanium film is stacked over a titanium nitride film; a two-layer structure in which a tungsten film is stacked over a titanium nitride film; a two-layer structure in which a tungsten film is stacked over a tantalum nitride film or a tungsten nitride film; and a three-layer structure in which a titanium film, an aluminum film, and a titanium film are stacked in that order.

Alternatively, a layered structure in which an alloy film or a nitride film that contains one or more elements selected from titanium, tantalum, tungsten, molybdenum, chromium, neodymium, and scandium is stacked over an aluminum film can be used.

Alternatively, a conductive oxide such as indium oxide, indium tin oxide, indium zinc oxide, zinc oxide, or zinc oxide to which gallium is added can be used.

Alternatively, graphene or graphite can be used. A film containing graphene can be formed, for example, by reducing a film containing graphene oxide. As a reducing method, a method with application of heat, a method using a reducing agent, or the like can be used.

Alternatively, a conductive high molecule can be used.

There is no particular limitation on the base material 520 as long as the base material 520 has flexibility, heat resistance high enough to withstand a manufacturing process, and thickness and size that can be used in a manufacturing apparatus. Note that in the case where the sensing portion 550 is provided on a side where the display portion 650 displays an image, a light-transmitting material is used as the base material 520.

An inorganic material, an organic material, a composite material of an organic material and an inorganic material, or the like can be used as the base material 520.

As the inorganic material for the base material 520, for example, glass (specifically, non-alkali glass, soda-lime glass, kali glass, crystal glass, or the like), ceramics, a metal oxide film, a metal nitride film, or a metal oxynitride film can be used. Examples of the metal oxide film include a silicon oxide film and an alumina film. Examples of the metal nitride film include a silicon nitride film. Examples of the metal oxynitride film include a silicon oxynitride film.

As the organic material for the base material 520, a resin, a resin film, or plastics can be used. For example, a resin film or resin plate of polyester, polyolefin, polyamide, polyimide, polycarbonate, an acrylic resin, or the like can be used for the base material 520.

As the composite material for the base material 520, for example, a composite material formed by attaching a thin glass plate or a film of an inorganic material or the like to a resin film or the like; a composite material formed by dispersing a fibrous or particulate metal, glass, inorganic material, or the like into a resin film; or a composite material formed by dispersing a fibrous or particulate resin, organic material, or the like into an inorganic material can be used.

A single-layer material or a stacked-layer material in which a plurality of layers are stacked can be used as the base material 520. For example, a stacked-layer material including a base material and an insulating layer that prevents diffusion of impurities contained in the base material can be used as the base material 520.

As a specific example of the stacked-layer material, a stacked-layer material in which glass, a silicon oxide film that prevents diffusion of impurities contained in the glass, and one or more films selected from a silicon nitride film, a silicon oxynitride film, and the like are stacked; a stacked-layer material in which a resin, a silicon oxide film that prevents diffusion of impurities passing through the resin, and a silicon nitride film, a silicon oxynitride film, or the like are stacked; or the like can be used for the base material 520.

In this embodiment, a stacked-layer material of a flexible base material 520*b*, a barrier film 520*a* that prevents diffusion of impurities, and a resin layer 520*c* that attaches the flexible base material 520*b* to the barrier film 520*a* is used as the base material 520 (see FIG. 9A).

The flexible printed circuit FPC1 supplies a timing signal, a power supply potential, or the like, and a sensing signal such as the fold sensing signal FSS is supplied to the flexible printed circuit FPC1.

The display portion 650 includes the pixel 622, a scan line, a signal line, or a base material 620 (see FIG. 8).

Note that a film for forming the display portion 650 may be formed over the base material 620, and the film may be processed into the display portion 650.

Alternatively, part of the display portion 650 may be formed over another base material, and the part of the display portion 650 may be transferred to the base material 620 to form the display portion 650.

The pixel 622 includes a subpixel 602B, a subpixel 602G, and a subpixel 602R, and each subpixel includes a display element and a pixel circuit for driving the display element.

The pixel circuit includes, for example, a transistor 622*t*.

The display portion 650 includes an insulating film 641 that covers the transistor 622*t*. The insulating film 641 can be used as a layer for planarizing unevenness due to the pixel circuit. A layered film including a layer that can inhibit diffusion of impurities can be used as the insulating film 641. This can inhibit the reliability of the transistor 622*t* or the like from being lowered by diffusion of impurities.

As a display element that can be used for the display portion 650, for example, any of display elements (electronic ink) that perform display by an electrophoretic method, an electronic liquid powder (registered trademark) method, an electrowetting method, or the like; MEMS shutter display elements; optical interference type MEMS display elements; liquid crystal elements; and the like can be used.

Furthermore, a display element that can be used for a transmissive liquid crystal display, a transflective liquid crystal display, a reflective liquid crystal display, a direct-view liquid crystal display, or the like can be used. For example, organic electroluminescent elements that emit light of different colors may be included in subpixels. For example, an organic electroluminescent element that emits white light can be used.

In this embodiment, a light-emitting element 640R is used as a display element. The light-emitting element 640R includes a lower electrode, an upper electrode, and a layer containing a light-emitting organic compound between the lower electrode and the upper electrode.

The subpixel 602R includes a light-emitting module 660R. The subpixel 602R further includes the light-emitting element 640R and the pixel circuit that can supply power to the light-emitting element 640R and includes the transistor 622*t*. Furthermore, the light-emitting module 660R includes the light-emitting element 640R and an optical element (e.g., the coloring layer CFR).

Note that a micro resonator can be provided in the light-emitting module 660R so that light of a particular wavelength can be extracted efficiently. Specifically, a layer containing a light-emitting organic compound may be provided between a film that reflects visible light and a film that semi-reflects and semi-transmits visible light so that light of a particular wavelength can be extracted efficiently.

The light-emitting module 660R includes the coloring layer CFR on the light extraction side. The coloring layer transmits light of a particular wavelength and can be, for example, a layer that selectively transmits red, green, or blue light. Note that another subpixel may overlap with the window portion in which the coloring layer is not provided, so that light from the light-emitting element can be emitted without passing through the coloring layer.

The coloring layer CFR overlaps with the light-emitting element 640R. Accordingly, part of light emitted from the light-emitting element 640R passes through the coloring layer CFR and is emitted to the outside of the light-emitting module 660R as indicated by an arrow in FIG. 9A.

The light-blocking layer BM is located to surround the coloring layer (e.g., the coloring layer CFR).

Note that when a sealant 644 is provided on the light extraction side, the sealant 644 may be in contact with the light-emitting element 640R and the coloring layer CFR.

The lower electrode is provided over the insulating film 641. A partition 528 that includes an opening portion overlapping with the lower electrode is provided. Note that part of the partition 528 overlaps with an end portion of the lower electrode.

A layer containing a light-emitting organic compound is held between the lower electrode and the upper electrode, so that a light-emitting element (e.g., the light-emitting element 640R) is formed. The pixel circuit supplies power to the light-emitting element.

Over the partition wall 528, a spacer that controls the distance between the base materials 520 and 620 is provided.

In the case of a transflective liquid crystal display or a reflective liquid crystal display, some or all of pixel electrodes function as reflective electrodes. For example, some or all of pixel electrodes are formed to contain aluminum, silver, or the like.

A storage circuit such as an SRAM can be provided below the reflective electrodes. Accordingly, power consumption can be further reduced. A structure suitable for display elements to be used can be selected from a variety of pixel circuits.

A flexible material can be used as the base material 620. For example, a material similar to the material that can be used as the base material 520 can be used as the base material 620.

Note that in the case where the base material 620 does not need to have light-transmitting properties, for example, a non-light-transmitting material, specifically, SUS, aluminum, or the like can be used.

For example, a layered structure in which a flexible base material 620*b*, a barrier film 620*a* that prevents diffusion of impurities, and a resin layer 620*c* that attaches the barrier film 620*a* to the base material 620*b* are stacked can be favorably used for the base material 620 (see FIG. 9A).

The sealant 644 attaches the base material 520 to the base material 620. The sealant 644 has a higher refractive index than air. In the case where light is extracted on the sealant 644 side, light can be extracted efficiently by reducing the difference in the refractive index between the sealant 644 and a layer in contact with the sealant 644 (e.g., the coloring layer CFR).

Note that the pixel circuit or the light-emitting element (e.g., the light-emitting element 640R) is provided between the base materials 620 and 520.

The scan line driver circuit 624G1 supplies selection signals and includes a transistor 624*t* and a capacitor 624*c*. Note that transistors that can be formed in the same process and over the same substrate as those of the pixel circuit can be used in the driver circuit. The above embodiments can be referred to for details of the scan line driver circuit.

The display portion 650 includes wirings such as scan lines, signal lines, and power supply lines. A material similar to the material of a conductive film that can be used for the sensing portion 550 can be used as a wiring material, for example.

The display portion 650 includes the wirings 611 through which signals can be supplied. The wirings 611 are provided with the terminal 619. Note that the flexible printed circuit FPC2 through which signals such as an image signal and a synchronization signal can be supplied is electrically connected to the terminal 619.

Note that a printed wiring board (PWB) may be attached to the flexible printed circuit FPC2.

The structure of a transistor applicable to the sensing portion 550 and/or the display portion 650 is not particularly limited. For example, FIG. 9A illustrates an example in which bottom-gate transistors are used in the sensing portion 550.

FIGS. 9A and 9B each illustrate an example in which bottom-gate transistors are used in the display portion 650.

A semiconductor material applicable to a transistor is not particularly limited. For example, a semiconductor layer containing an oxide semiconductor, amorphous silicon, or the like can be used in each of the transistors 622*t* and 624*t* in FIG. 9A. Alternatively, for example, a semiconductor layer containing polycrystalline silicon obtained by crystallization process such as laser annealing can be used in each of the transistors 622*t* and 624*t* in FIG. 9B.

FIG. 9C illustrates an example in which top-gate transistors are used in the display portion 650. For example, a semiconductor layer including polycrystalline silicon, a single crystal silicon film that is transferred from a single crystal silicon substrate, or the like can be used in each of the transistors 622*t* and 624*t* in FIG. 9C.

Note that this embodiment can be combined with any of the other embodiments in this specification as appropriate.

Embodiment 5

In this embodiment, examples of an electronic device including a semiconductor device in one embodiment of the present invention are described with reference to drawings.

Examples of an electronic device including a developable and foldable semiconductor device include television sets (also referred to as televisions or television receivers), monitors of computers or the like, cameras such as digital cameras or digital video cameras, digital photo frames, cellular phones (also referred to as mobile phones or cellular phone devices), portable game machines, portable information terminals, audio reproducing devices, and large game machines.

FIGS. 10A, 10B1, and 10B2 illustrate a tablet terminal 9600 that can be folded in two. Although the tablet terminal can be folded in two here, a tablet terminal that can be folded in three, four, or more can also be used. In FIG. 10A, the tablet terminal 9600 is opened, and includes a housing 9630, a display portion 9631, a sensing portion 9632 of a touch sensor, a power switch 9627, and a fastener 9629.

The housing 9630 includes housings 9630*a* and 9630*b*, and the housings 9630*a* and 9630*b* are connected to each other with a connection member 9639. The connection member 9639 functions as a hinge when the housing 9630 is folded in two.

The display portion 9631 is formed with a foldable display panel supported by the housings 9630*a* and 9630*b*. A panel including an active touch sensor is provided to overlap with the display panel, and the sensing portion 9632 of the touch sensor overlaps with at least part of the display portion 9631.

In FIG. 10B1, the tablet terminal 9600 is folded with the display portion 9631 and the sensing portion 9632 facing outward. In that case, the power consumption of the tablet terminal 9600 can be reduced by stopping operation of a display portion and/or a sensing portion of a region that is not seen by a user of the tablet terminal 9600 (e.g., a region supported by the housing 9630*b*).

In FIG. 10B2, the tablet terminal 9600 is folded with the display portion 9631 and the sensing portion 9632 facing inward. The tablet terminal 9600 may include the housing 9630, a solar cell 9633, and a charge and discharge control circuit 9634. Note that FIG. 10B2 illustrates an example in which the charge and discharge control circuit 9634 includes a battery 9635 and a DCDC converter 9636.

Since the tablet terminal 9600 can be folded in two, the housing 9630 can be folded when the tablet terminal is not used. Therefore, the tablet terminal is excellent in portability and is excellent in durability because the display portion 9631 can be protected when the housing 9630 is folded; accordingly, the tablet terminal is excellent in reliability in the light of long-term use. In addition, when the tablet terminal 9600 is set in a developed state, the tablet terminal can have high display browsability and include a large-screen display portion and/or sensing portion.

The tablet terminal in FIGS. 10A, 10B1, and 10B2 can have other functions such as a function of displaying various kinds of data (e.g., a still image, a moving image, and a text image), a function of displaying a calendar, a date, the time, or the like on the display portion, a touch-input function of operating or editing the data displayed on the display portion by touch input, and a function of controlling processing by various kinds of software (programs).

The solar cell 9633 provided on a surface of the tablet terminal can supply power to the touch panel, the display portion, the sensing portion, an image signal processor, and the like. Note that the solar cell 9633 can be provided on one or both surfaces of the housing 9630, so that the battery 9635 can be charged efficiently. When a lithium ion battery is used as the battery 9635, there is an advantage of downsizing or the like.

The structure and operation of the charge and discharge control circuit 9634 in FIG. 10B2 are described with reference to a block diagram of FIG. 10C. FIG. 10C illustrates the solar cell 9633, the battery 9635, the DCDC converter 9636, a converter 9637, switches SW1 to SW3, and the display portion 9631. The battery 9635, the DCDC converter 9636, the converter 9637, and the switches SW1 to SW3 correspond to the charge and discharge control circuit 9634 in FIG. 10B2.

First, an operation example when power is generated by the solar cell 9633 using external light is described. The voltage of power generated by the solar cell is raised or lowered by the DCDC converter 9636 so that voltage for charging the battery 9635 is obtained. When the display portion 9631 is operated with power from the solar cell 9633, the switch SW1 is turned on and the voltage of the power is raised or lowered by the converter 9637 to voltage needed for operating the display portion 9631. In addition, when images are not displayed on the display portion 9631, the switch SW1 is turned off and the switch SW2 is turned on so that the battery 9635 is charged.

Although the solar cell 9633 is described as an example of a power generation unit, the power generation unit is not particularly limited, and the battery 9635 may be charged by another power generation unit such as a piezoelectric element or a thermoelectric conversion element (Peltier element). For example, the battery 9635 may be charged using a non-contact power transmission module that transmits and receives power wirelessly (without contact) or using another charge unit in combination.

Note that one embodiment of the present invention is not limited to the above electronic devices as long as the semiconductor device in one embodiment of the present invention is included.

Any of the structures, methods, and the like described in this embodiment can be combined with any of the structures, methods, and the like described in the other embodiments as appropriate.

This application is based on Japanese Patent Application serial No. 2014-095028 filed with Japan Patent Office on May 2, 2014, the entire contents of which are hereby incorporated by reference.

What is claimed is:

1. A semiconductor device comprising:
a movable portion;
a signal line control circuit;
a plurality of scan line driver circuits; and
a control portion,
wherein the movable portion includes a plurality of regions driven by the plurality of scan line driver circuits,
wherein each of the plurality of regions comprises a plurality of unit circuits,
wherein each of the plurality of unit circuits in the plurality of regions is electrically connected to the signal line control circuit,
wherein an output terminal of one of the plurality of scan line driver circuits is electrically connected to an input terminal of another one of the plurality of scan line driver circuits through a switch such that an output from the output terminal of the one of the plurality of scan line driver circuits is input to the input terminal of the another one of the plurality of scan line driver circuits through the switch,
wherein the control portion outputs a start pulse to an input terminal of the one of the plurality of scan line driver circuits when the movable portion is in a first state and a start pulse to the input terminal of the another one of the plurality of scan line driver circuits when the movable portion is in a second state, and
wherein the movable portion is foldable between the plurality of regions.

2. The semiconductor device according to claim 1, further comprising an arithmetic portion,
wherein the arithmetic portion is capable of sensing whether one region in the movable portion is in contact with the other region in the movable portion, determining a developed or folded state of the movable portion depending on a shape of a contact portion of the movable portion, and instructing the control portion to supply the start pulse when the movable portion is in a folded state.

3. The semiconductor device according to claim 1, wherein the movable portion comprises a display portion.

4. The semiconductor device according to claim 1, wherein the movable portion comprises a sensing portion of a touch sensor.

5. A semiconductor device comprising:
a movable portion;
a first scan line driver circuit;
a second scan line driver circuit;
a signal line control circuit; and
a control portion,
wherein the movable portion includes a first region and a second region,
wherein the first region includes a plurality of transistors arranged in a matrix,
wherein the second region includes a plurality of transistors arranged in a matrix,
wherein the plurality of transistors in the first region is electrically connected to the signal line control circuit,
wherein the plurality of transistors in the second region is electrically connected to the signal line control circuit,
wherein the first scan line driver circuit includes first to k-th shift registers,
wherein k is an integer of two or more,
wherein the second scan line driver circuit includes (k+1) th to h-th shift registers,
wherein h is an integer of four or more, where $(k+1)<h$,
wherein an output terminal of the first scan line driver circuits electrically connected to an input terminal of the second scan line driver circuit through a switch such that an output from the output terminal of the first scan line driver circuit is input to the input terminal of the second scan line driver circuit through the switch,
wherein the first scan line driver circuit is configured to drive a plurality of transistors included in the first region,
wherein the second scan line driver circuit is configured to drive a plurality of transistors included in the second region,
wherein the control portion outputs a start pulse to an input terminal of the first scan line driver circuit when the movable portion is in a first state and a start pulse to the input terminal of the second scan line driver circuit when the movable portion is in a second state, and
wherein the movable portion is foldable between the first region and the second region.

6. The semiconductor device according to claim 5, wherein the control portion is configured to turn on the switch and supply a start pulse to the first scan line driver circuit and is configured to turn off the switch and supply a start pulse to the second scan line driver circuit.

7. The semiconductor device according to claim 5, wherein the control portion is configured to turn on the switch and supply a reset signal to any one of the (k+2)th to (h−1)th shift registers.

8. The semiconductor device according to claim 5, further comprising an arithmetic portion,
wherein the arithmetic portion is capable of sensing whether one region in the movable portion is in contact with the other region in the movable portion, determining a developed or folded state of the movable portion depending on a shape of a contact portion of the movable portion, and instructing the control portion to supply the start pulse when the movable portion is in a folded state.

9. The semiconductor device according to claim 5, wherein the movable portion comprises a display portion.

10. The semiconductor device according to claim 5, wherein the movable portion comprises a sensing portion of a touch sensor.

11. A semiconductor device comprising:
a movable portion;
a first scan line driver circuit;
a second scan line driver circuit;
a third scan line driver circuit;
a signal line control circuit; and
a control portion,
wherein the movable portion includes a first region, a second region, and a third region,
wherein the first region includes a plurality of transistors arranged in a matrix,
wherein the second region includes a plurality of transistors arranged in a matrix,
wherein the third region includes a plurality of transistors arranged in a matrix,
wherein the plurality of transistors in the first region is electrically connected to the signal line control circuit,
wherein the plurality of transistors in the second region is electrically connected to the signal line control circuit,
wherein the plurality of transistors in the third region is electrically connected to the signal line control circuit,
wherein the first scan line driver circuit includes first to k-th shift registers, wherein k is an integer of two or more,
wherein the second scan line driver circuit includes (k+1)th to h-th shift registers,
wherein h is an integer of four or more, where (k+1)<h,
wherein the third scan line driver circuit includes (h+1)th to t-th shift registers,
wherein t is an integer of six or more, where (h+1)<t,
wherein an output terminal of the first scan line driver circuit electrically connected to an input terminal of the second scan line driver circuit through a first switch such that an output from the output terminal of the first scan line driver circuit is input to the input terminal of the second scan line driver circuit through the first switch,
wherein an output terminal of the second scan line driver circuit electrically connected to an input terminal of the second scan line driver circuit through a second switch such that an output from the output terminal of the second scan line driver circuit is input to the input terminal of the second scan line driver circuit through the second switch,
wherein the first scan line driver circuit is configured to drive a plurality of transistors included in the first region,
wherein the second scan line driver circuit is configured to drive a plurality of transistors included in the second region,
wherein the third scan line driver circuit is configured to drive a plurality of transistors included in the third region,
wherein the control portion is configured to turn on the first switch and supply a start pulse to the first scan line driver circuit, is configured to turn off the first switch, turn on the second switch, and supply a start pulse to the second scan line driver circuit, and is configured to turn off the first and the second switches and supply a start pulse to the third scan line driver circuit, and
wherein the control portion is configured to turn on the first switch and supply a start pulse to the first scan line driver circuit is configured to turn off the first switch, turn on the second switch, and supply a start pulse to the second scan line driver circuit, and is configured to turn off the first and the second switches and supply a start pulse to the third scan line driver circuit, and
wherein the movable portion is foldable between the first region and the second region and between the second region and the third region.

12. The semiconductor device according to claim 11, further comprising an arithmetic portion,
wherein the arithmetic portion is capable of sensing whether one region in the movable portion is in contact with the other region in the movable portion, determining a developed or folded state of the movable portion depending on a shape of a contact portion of the movable portion, and instructing the control portion to supply the start pulse when the movable portion is in a folded state.

13. The semiconductor device according to claim 11, wherein the movable portion comprises a display portion.

14. The semiconductor device according to claim 11, wherein the movable portion comprises a sensing portion of a touch sensor.

* * * * *